(12) United States Patent
Sharif-Ahmadi et al.

(10) Patent No.: US 11,252,474 B2
(45) Date of Patent: *Feb. 15, 2022

(54) SYSTEM AND METHOD FOR MANAGING STREAMING SERVICES

(71) Applicant: MIMIK TECHNOLOGY INC., Vancouver (CA)

(72) Inventors: Seyed M. Sharif-Ahmadi, Richmond (CA); Sam Armani, Richmond (CA)

(73) Assignee: MIMIK TECHNOLOGY INC., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/507,795

(22) Filed: Jul. 10, 2019

(65) Prior Publication Data

US 2020/0014877 A1  Jan. 9, 2020

Related U.S. Application Data

(63) Continuation of application No. 14/389,601, filed as application No. PCT/CA2013/000285 on Apr. 2, 2013, now Pat. No. 10,375,343.

(30) Foreign Application Priority Data

Mar. 30, 2012 (CA) ..................................... 2773342
Oct. 3, 2012 (CA) ..................................... 2791935

(51) Int. Cl.
*H04N 7/18* (2006.01)
*H04N 21/47* (2011.01)
(Continued)

(52) U.S. Cl.
CPC ......... *H04N 21/47* (2013.01); *G06Q 30/0267* (2013.01); *G08C 17/02* (2013.01);
(Continued)

(58) Field of Classification Search
CPC ......... H04N 21/44222; H04N 21/6582; H04N 21/4532; H04N 21/812; H04N 21/25891;
(Continued)

(56) References Cited

U.S. PATENT DOCUMENTS 4,566,030 A  1/1986  Nickerson et al.
7,313,803 B1 * 12/2007  Lynch ................... H04N 7/163
                                                          348/E7.061
(Continued)

FOREIGN PATENT DOCUMENTS

GB   2483092 A2   2/2012
WO   2007/103700 A2   9/2007

OTHER PUBLICATIONS

International Search Report and Written Opinion for PCT/CA2013/000285 dated Sep. 10, 2013.

*Primary Examiner* — Annan Q Shang
(74) *Attorney, Agent, or Firm* — Maschoff Brennan

(57) ABSTRACT

A gateway for location at a user premises is provided. Bother users and user devices are registered with the gateway which is provided by a service provider. Users access services, such as video streaming, on their user devices via the gateway. The gateway allows users to share content. The gateway collects information about the user's patterns of behaviour for the system provider, and can be used to directly obtain feedback from the user.

18 Claims, 17 Drawing Sheets

(51) Int. Cl.
| | |
|---|---|
| *H04N 7/10* | (2006.01) |
| *H04N 21/258* | (2011.01) |
| *H04N 21/426* | (2011.01) |
| *H04N 21/431* | (2011.01) |
| *G08C 17/02* | (2006.01) |
| *H04L 65/1023* | (2022.01) |
| *H04L 65/60* | (2022.01) |
| *G06Q 30/02* | (2012.01) |
| *H04N 21/466* | (2011.01) |
| *H04W 48/20* | (2009.01) |
| *H04W 4/02* | (2018.01) |
| *H04N 21/422* | (2011.01) |

(52) U.S. Cl.
CPC ........ *H04L 65/1023* (2013.01); *H04L 65/607* (2013.01); *H04N 7/106* (2013.01); *H04N 21/25891* (2013.01); *H04N 21/42676* (2013.01); *H04N 21/4316* (2013.01); *H04N 21/4667* (2013.01); *H04W 48/20* (2013.01); *G08C 2201/30* (2013.01); *G08C 2201/40* (2013.01); *H04N 21/422* (2013.01); *H04N 21/4222* (2013.01); *H04N 21/42204* (2013.01); *H04N 21/42224* (2013.01); *H04W 4/023* (2013.01)

(58) Field of Classification Search
CPC ........... H04N 7/17318; H04N 7/17309; H04N 21/47; H04N 21/4316; H04N 21/4667; H04N 7/106; H04N 21/42676; H04N 21/4222; H04N 21/42224; G06Q 30/0267; H04W 48/20; H04W 4/023; H04L 65/1023; H04L 65/607; G08C 17/02; G08C 2201/30; G08C 2201/40
See application file for complete search history.

(56) References Cited

U.S. PATENT DOCUMENTS

| | | | | |
|---|---|---|---|---|
| 7,937,725 | B1* | 5/2011 | Schaffer | H04N 21/4826 |
| | | | | 725/46 |
| 8,291,453 | B2 | 10/2012 | Boortz | |
| 8,644,702 | B1* | 2/2014 | Kalajan | G06F 21/6218 |
| | | | | 396/429 |
| 8,836,771 | B2* | 9/2014 | Strong | H04N 21/41407 |
| | | | | 348/53 |
| 8,858,313 | B1 | 10/2014 | Selfors | |
| 2002/0184629 | A1 | 12/2002 | Sie et al. | |
| 2004/0070593 | A1 | 4/2004 | Neely et al. | |
| 2004/0070620 | A1* | 4/2004 | Fujisawa | G09G 3/20 |
| | | | | 715/764 |
| 2005/0021387 | A1 | 1/2005 | Gottfurcht | |
| 2005/0157217 | A1 | 7/2005 | Hendricks | |
| 2006/0074708 | A1 | 4/2006 | Woods | |
| 2006/0253330 | A1 | 11/2006 | Maggio et al. | |
| 2007/0088553 | A1 | 4/2007 | Johnson | |
| 2007/0244752 | A1 | 10/2007 | Bayne | |
| 2008/0155614 | A1* | 6/2008 | Cooper | G06F 21/10 |
| | | | | 725/91 |
| 2008/0195949 | A1* | 8/2008 | Baum | G06F 9/44505 |
| | | | | 715/723 |
| 2008/0235746 | A1 | 9/2008 | Peters et al. | |
| 2008/0279216 | A1 | 11/2008 | Sharif-Ahmadi et al. | |
| 2009/0133051 | A1* | 5/2009 | Hildreth | H04N 21/4223 |
| | | | | 725/28 |
| 2009/0133081 | A1* | 5/2009 | Sakai | H04N 7/173 |
| | | | | 725/105 |
| 2010/0007458 | A1* | 1/2010 | Cannistraro | H04L 67/125 |
| | | | | 340/3.71 |
| 2010/0031162 | A1 | 2/2010 | Wiser et al. | |
| 2010/0115575 | A1* | 5/2010 | Yu | H04N 7/17318 |
| | | | | 725/142 |
| 2010/0138868 | A1* | 6/2010 | Sie | H04N 5/44543 |
| | | | | 725/46 |
| 2010/0251292 | A1* | 9/2010 | Srinivasan | H04H 20/57 |
| | | | | 725/37 |
| 2011/0069940 | A1* | 3/2011 | Shimy | H04N 5/44543 |
| | | | | 386/296 |
| 2011/0106750 | A1 | 5/2011 | Pradeep et al. | |
| 2011/0164558 | A1* | 7/2011 | Chee | H04W 28/06 |
| | | | | 370/328 |
| 2011/0197240 | A1 | 8/2011 | Li et al. | |
| 2011/0282749 | A1 | 11/2011 | Pradeep et al. | |
| 2012/0011529 | A1 | 1/2012 | Howcroft et al. | |
| 2012/0023518 | A1 | 1/2012 | Meuninck et al. | |
| 2012/0117595 | A1* | 5/2012 | Svendsen | H04N 5/76 |
| | | | | 725/39 |
| 2012/0198359 | A1* | 8/2012 | Lossia | G06Q 50/01 |
| | | | | 715/758 |
| 2012/0272256 | A1* | 10/2012 | Bedi | H04N 21/4755 |
| | | | | 725/5 |
| 2012/0274750 | A1* | 11/2012 | Strong | H04L 65/4084 |
| | | | | 348/52 |
| 2012/0311633 | A1* | 12/2012 | Mandrekar | H04N 21/4126 |
| | | | | 725/40 |
| 2012/0316840 | A1* | 12/2012 | Dayde | G06F 30/18 |
| | | | | 703/1 |
| 2013/0024293 | A1 | 1/2013 | Tinsman et al. | |
| 2013/0050274 | A1* | 2/2013 | Yamada | H04N 21/4316 |
| | | | | 345/671 |
| 2013/0073387 | A1 | 3/2013 | Heath | |
| 2013/0073400 | A1 | 3/2013 | Heath | |
| 2013/0073473 | A1 | 3/2013 | Heath | |
| 2013/0093670 | A1* | 4/2013 | Iwai | H04N 21/4316 |
| | | | | 345/156 |
| 2013/0111355 | A1* | 5/2013 | Jennings | H04L 12/1822 |
| | | | | 715/753 |
| 2013/0159499 | A1 | 6/2013 | Besehanic | |
| 2013/0170813 | A1* | 7/2013 | Woods | H04N 5/765 |
| | | | | 386/200 |
| 2014/0223464 | A1* | 8/2014 | Moran | H04N 21/44222 |
| | | | | 725/12 |
| 2014/0236732 | A1 | 8/2014 | Abhyanker | |
| 2014/0237053 | A1 | 8/2014 | Abhyanker | |
| 2015/0180747 | A1 | 6/2015 | Borenstein | |
| 2016/0029155 | A1 | 1/2016 | Kerr et al. | |
| 2017/0201779 | A1 | 7/2017 | Publicover et al. | |

* cited by examiner (Prior Art)

FIGURE 6
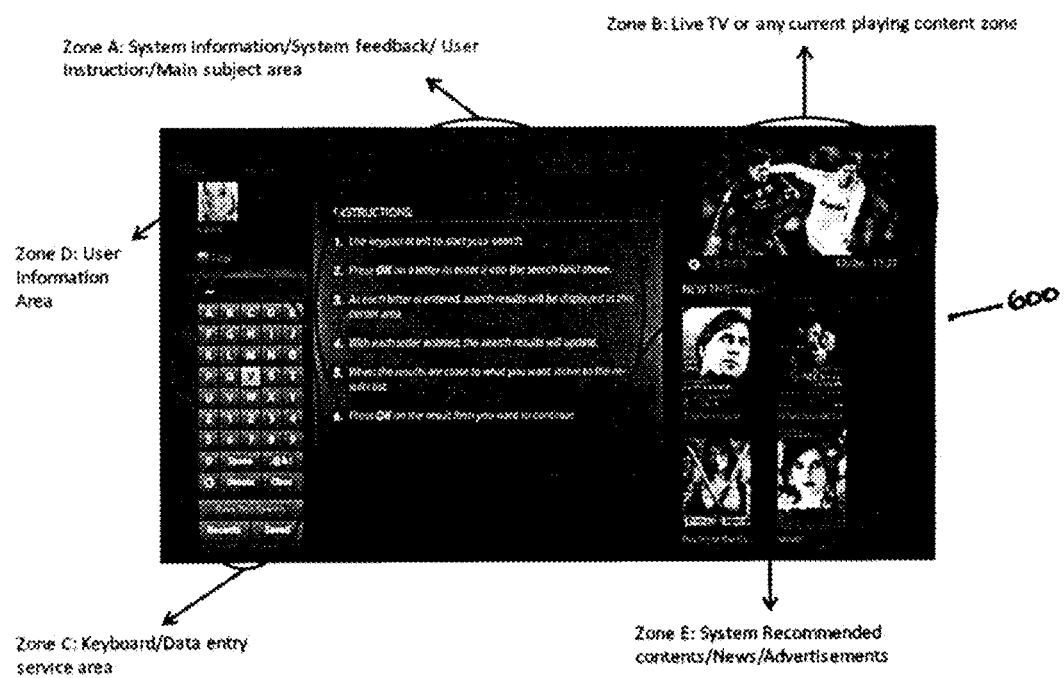
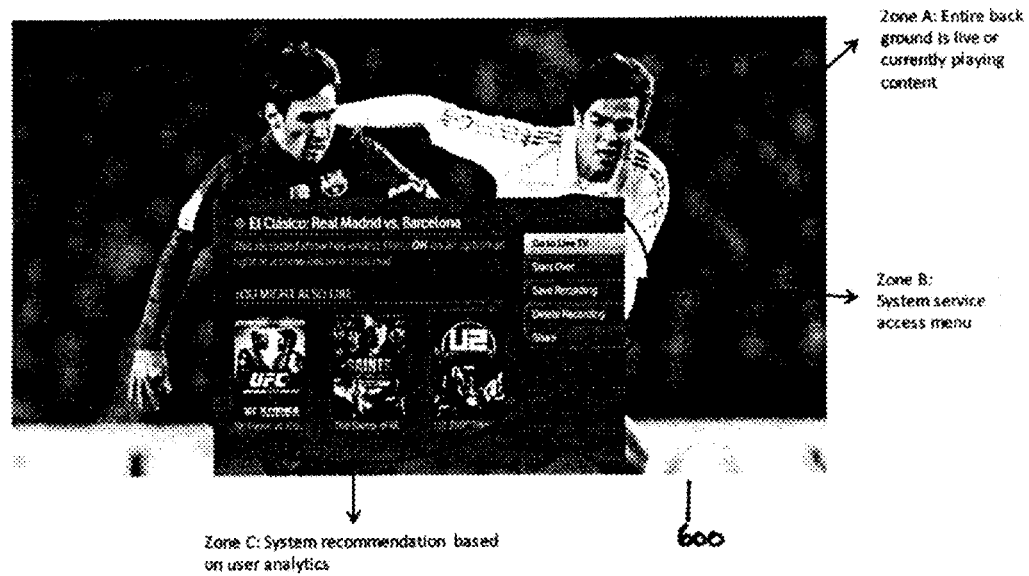
FIGURE 7

Remote control app with gesture functionality

Remote control app with simulated D-Pad

Figure 9: Remote Control app for mobile devices

The red circle shows the area of gesture functionality

Remote control app with D-pad function    Remote control app with control buttons    Remote control app with numeric pad buttons    Remote control app with keyboard functionality

SYSTEM AND METHOD FOR MANAGING STREAMING SERVICES

CROSS-REFERENCE TO RELATED APPLICATIONS

This application is a continuation of co-pending U.S. patent application Ser. No. 14/389,601, filed on Sep. 30, 2014, which is a U.S. National Phase Application under 35 USC 371 of International Application No. PCT/CA2013/000285 having an International Filing Date of Apr. 2, 2013 and entitled, "SYSTEM AND METHOD FOR MANAGING STREAMING SERVICES", which claims the benefit of priority to Canadian Patent Application No. 2,773,342, filed on Mar. 30, 2012, and Canadian Patent Application No. 2,791,935, filed on Oct. 3, 2012, all of which are hereby incorporated by reference in their entirety.

TECHNICAL FIELD

The present disclosure is directed at a system and method for managing content delivery services, and more particularly for managing such services amongst a plurality of user devices though a common gateway.

BACKGROUND

The growth in data transmitted over wireless and cable networks has been driving consolidation of broadband operators, and creating a highly competitive global broadband service provision market. "Operator" refers to an operator of a high-speed network that offers data transfer services over one or more types of networks (e.g.: mobile networks and other wireless networks, wired networks, including telephone, cable satellite, and mobile networks, or a combination of these). "Broadband service" includes content delivered over a network; the network may be wired, wireless, cable, DSL, or other digital communication systems, or any combination thereof.

Operators are evolving and becoming broadband service providers (referred to herein as "service providers"). Triple or quad operators means operators that provide three or four services, such as residential Internet service, residential phone service, residential television, and mobile data services, which may in turn, include voice, Internet, and television. Data usage over both wireless, DSL and cable networks around the world is growing. Service providers may grow revenue by offering users a variety of services, and by reducing the cost of the network operation centers ("NOCs") and the cost of data links. Today, service providers are offering more services and applications, requiring larger NOCs, which in turn translates to higher operating costs for the service providers and therefore lower average revenue per user ("ARPU"). Service providers are looking for solutions that allow them to run smaller NOCs, offer services suited to users' profiles and the type of device that the user is using at the time (e.g.: television ("TV"), laptop computer, desktop computer, pads, eReaders, or smartphone).

Today, service providers can often identify where users are located, but it is difficult to know what type of content users want based on their context. "Context" includes information about the nature of the user and content, including: information that refers to the user's location; the type of device the user is using to access the network; the level of connectivity access the user has; the user state, which includes information such as whether the user is connected to the network using a mobile or wired connection; whether the user is accessing the network from home or while traveling (e.g.: on vacation or on a business trip); to which networks the user is connected; and the user's interests and history.

User demand for accessing media-rich content in real time is growing; concurrently, the types of devices that are used to view such media-rich content are also growing. Broadband networks resulted from the migration of multiple networks, each having different characteristics and operating as silo networks wherein devices, applications, and networks are tightly coupled. Typical broadband networks are designed based on the assumption that user devices used to access content are dumb terminals with little ability to run rich multimedia applications. Typical broadband networks were also designed under the assumption that traffic growth will remain linear, which has been an underestimate.

Conventional solutions to satisfying user demands for delivery of rich multimedia content in real-time has centered on a "core-centric" approach in which a centralized server resides within a NOC for each different type of network; an exemplary "core-centric" network 100 is depicted in FIG. 1. This means that if a service provider is operating broadband networks to deliver TV content, residential Internet content and cellular phone content to specific user devices, then such service providers would use three different NOCs, TV NOC 250, Internet NOC 350 and cellular NOC 450, respectively. Each is directed to a particular type of user device, which usually do not share networks or content, for example, the user's laptop computer cannot use the cellular phone's cellular network to access content. Likewise the cellular phone cannot access the cable network.

In such a model, a service provider uses software and servers that offer functionality such as determining the automatic bit rate ("ABR"), providing content inspections, and providing personalization engines that are installed within each NOC. Challenges arise when employing these approaches and serving large numbers, e.g. millions, of users; shortcomings associated with these approaches include scalability issues, accuracy issues, and synchronization of collected information. As depicted in FIG. 1 a triple and quad player operator is managing multiple NOCs 250, 350 and 450, and within each NOC is run the same set of services including video transcoding and transrating engines, content reformatting, caching and proxy services.

Three changes are simultaneously occurring with respect to broadband networks. The first relates to digital content. The amount of content available on the Internet is overwhelming for end users, even very technically savvy users, and the amount of content is still growing exponentially. This includes on-demand digital video streaming, television services such as video on demand ("VoD"), subscription video on demand ("SVoD") and pay-per-view ("PPV"). Also included in this market is on-line video advertising, Internet protocol television ("IPTV") and mobile TV, as well as television provided through cable, digital cable set top boxes, and satellite. References to "television" or "TV" herein shall refer to any of the above listed streaming video services.

The second relates to the effect of a new generation of users and their needs. These new users (often referred to as "Millennials"), represent the most populous generation that has ever lived on this planet. They tend to be technology-centric, and both dependent on and aware of technology. On average, each spends over $100 per week on technology-oriented products and services and directly influences over 80% of the spending in the home. This is the generation that wants the right information suited to their needs and context, delivered in the least amount of time. This group of users are socially connected through their mobile phone, laptop and desktop computers, and are the driving force behind enabling connectivity through TV. This generation wants to have personalized content; namely, content that is available on their own terms rather than on the terms of service providers and operators. This is the generation that does not want to be bound to a particular location or device to access specific content. They like to be able to watch TV content on any device and location within and outside of the home and not just on a TV display. They also want to be able to access Internet content and/or social networking services such as Twitter on their TV display while watching TV. They are not only content consumers but also content generators and distributors.

The third relates to advancements in technology, and particularly advancements in customer premises equipment ("CPE"). A household often no longer just has a single TV display and a PC but may have multiple laptops and PCs, along with TV displays and mobile devices, such as smart phones, cellular phones, video game devices, net books, electronic reading tools ("eReaders"), pads, and portable music and video players, that are used in or outside of their homes (collectively, referred to herein as "user devices"). Additionally, users often have access to other user devices such as home residential gateways, set-top-boxes, routers, Wi-Fi access points and other networking equipment, and the use and availability of such equipment is growing rapidly. These changes mean that content is no longer created, controlled and distributed by a specific organization, such as service providers, but instead content can be produced by anyone within a network and either pushed to, or requested by, anyone within the network. Such content includes place shifted video content, multimedia streams, and personal digital content. Therefore, a centralized approach wherein content is always produced by a selected entity and then distributed to subscribers will no longer be effective due to variation between user interests, and because many users wish to play a more active role in generating content. Additionally, to centralize all content being created for distribution also will not be effective due to the heavy network traffic that would result from distributing such content.

Shortcomings associated with the prior art include:
1. Pre-formatted content storage any types of device
Users' content preferences are very different, when, for example, they are outside of home, than when they are in front of their big TV screen. Deciding on storing the type of content for possible access from outside of home is therefore difficult. Also keeping multiple formats suitable for all potential user devices that may be used to experience the content is not efficient. Typical user devices renew and update data displays very quickly and therefore repeatedly mining data and archiving different formats for possible access by different user devices is cumbersome, costly and inefficient.
2. Content Inspection
The data traffic path for the user is not always the same. The purpose of content inspection is to identify the user's interests. However, the user's interest is best determined based on user habits over a period of time and not solely based on a snapshot of the user's current content usage. Distributing content inspection over multiple network nodes provides a snapshot of the user's current usage based only on the current traffic flow. Storing all traffic flows, determining the user identity, synchronizing the information for a post content inspection process in order to inspect usage over a longer period of time requires large amounts of storage, and extensive processing time. This is highly costly and inefficient. Conventional means allow the type of content the user is looking at any given moment in time to be determined, rather than a long term view. Consequently, the real preferences of the user under different conditions cannot be predicted accurately.

In the prior art, a CPE only facilitates providing CPE specific and vertical functions, e.g. a CPE that only provides Set-Top-Box functionality or a CPE that provides Internet connectivity functionality. Furthermore, in conventional methods the CPE has no role in content distribution functionality among subscribers while they are at home or outside using different methods of connectivity and in delivering content concurrently to different devices and/or users in parallel.

Accordingly, there exists a need for a method and system that improves on the deficiencies of the prior art.

SUMMARY OF THE INVENTION

The system and method according to the invention includes a gateway (also referred to herein as a "serving node" or "debox"), to which user devices are registered and which serves as an intermediary between such registered user devices and content.

The system and method according to the invention includes a gateway having a control manager and a streaming server.

The control manager is responsible for registration of user devices with the box, including information about the capabilities and limitations of such device, and the users with whom the device is associated.

The control manager maintains usage logs for each user device. These logs can be used to improve Quality of Service (QoS) by determining when errors or poor performance occurs and taking steps to improve the quality (for example by increasing the buffer for streaming video).

The control manager acts as a message broker between user devices when one is used to interact with or access content on the other.

The control manager also manages the TV tuners included as part of the gateway. Such tuners, and associated EPG information, are set to the appropriate channel and output to the appropriate user device by sending a request to the streaming server.

The streaming server handles several duties. It opens the port to the TV tuner, and handles the Electronic Program Guide (EPG), and modifies the format of content to the type of user device requesting the signal.

The streaming server also sets and monitors the quality of signal based on the size of the display. The streaming server controls the size of the buffer needed based on the limitations of the device, its processor, the size of the display and the signal. Past user experiences with the device may be taken into account.

The streaming server thus can adapt to learned limitations of a user device to improve experience and can handle resolution changes and needs.

When a user device is receiving Internet content, the streaming server can send a link to the user device to the content and play no other role. Alternatively, if the user device is local to the streaming server, the gateway can receive the content and adapt it for the user device.

The streaming server uses a transcoder to convert content from one format to another. The transcoder provides both a coding and decoding process. It receives input, decodes it, and codes it again as needed by the user device.

The gateway is able to authenticate users and user devices. Limits on use may be in place (for example limits on a user's ability to access certain web sites or channels). A single sign on (SSO) and backend gateway system may be used.

The authentication process can be used for local filtering so as not to display certain scenes displaying objectionable material (such as violence/sex) based on ratings of content (which may be scene by scene or a larger piece of content, like a show or movie). This can also be used to handle parental controls such as limit use to certain hours of the day or an overall limit on usage per day.

On use of the system is to take advantage of the connection between the user device and the gateway, which occurs even if the user device is distant from the gateway (e.g. outside of Wi-Fi range). This allows a user device to receive adds based on past users experiences, like browsing history, not available when logging in directly to a distant network.

A method of determining a closest node for a user device is provided, including: providing a gateway having a server for receiving a request for content from a mobile user device at a remote location; authenticating the user and user device as associated with the gateway; requesting the mobile device type and IP address from the mobile device; determining a geographic location of the mobile device; determining a proximity routing table for the mobile device; and determining a proximity neighbour information table for the mobile device. The gateway further accesses a database associated with the user device to determine patterns of the user thereof.

The method of claim 2 wherein the patterns are provided to an advertisement server, and advertisements are transmitted to the mobile device based on the patterns.

A method of displaying content on a television display is provided, including: determining a plurality of zones on said television display; displaying a video stream on a first zone; displaying means for user input on a second zone; and displaying content from the Internet on a third zone. The content from the Internet may be from a social networking web site.

A system for controlling a television with a mobile phone is provided, including: a gateway in communication with the television and the mobile phone; an application on the mobile phone displaying the functions of a remote control; on input from a user of the mobile phone, the input is communicated to the gateway, the gateway communicating the input to the television. The display on the mobile phone may be a d-pad.

A method of controlling a television with a mobile phone is provided, including: providing a gateway in communication with the television and the mobile phone; providing an application on the mobile phone, the application displaying the functions of a remote control on a touchscreen of the phone; on receipt of input on the mobile phone, communicating the input to the gateway; on receipt of the input from the gateway communicating the input to the television.

A method of determining usage patterns is provided, including: providing a gateway through which a plurality of users with a plurality of user devices can process content; when one of said users process content on one of said user devices, determining a particular user and a particular user device; the gateway gathering information about the content; analyzing the pattern of content processed by the particular user.

A method of obtaining feedback about a video stream is provided, including: the video stream provided to a user device, through a gateway, said user device and an associated user registered with said gateway, including biographic information about said user; at the conclusion of said video stream, providing a questionnaire to said user, answerable on said user device; said gateway retrieving answers to said questionnaire, and returning said answers and biographic information to a server. The video stream may be a pilot episode of television.

A method of remotely managing a gateway in a residential home is provided, including: a service provider providing the gateway to the home; the gateway generating functionality reports to the service provider; the service provider providing technical support to the gateway based on the functionality reports.

An earlier embodiment of the gateway is described in PCT application no. PCT/CA2010/001536, which is hereby incorporated by reference.

BRIEF DESCRIPTION OF THE FIGURES

FIG. 6 is a drawing showing the split screen function according to the invention.

FIG. 7 is a drawing showing an alternate split screen function according to the invention.

DETAILED DESCRIPTION

1. Introduction

Figure 1:
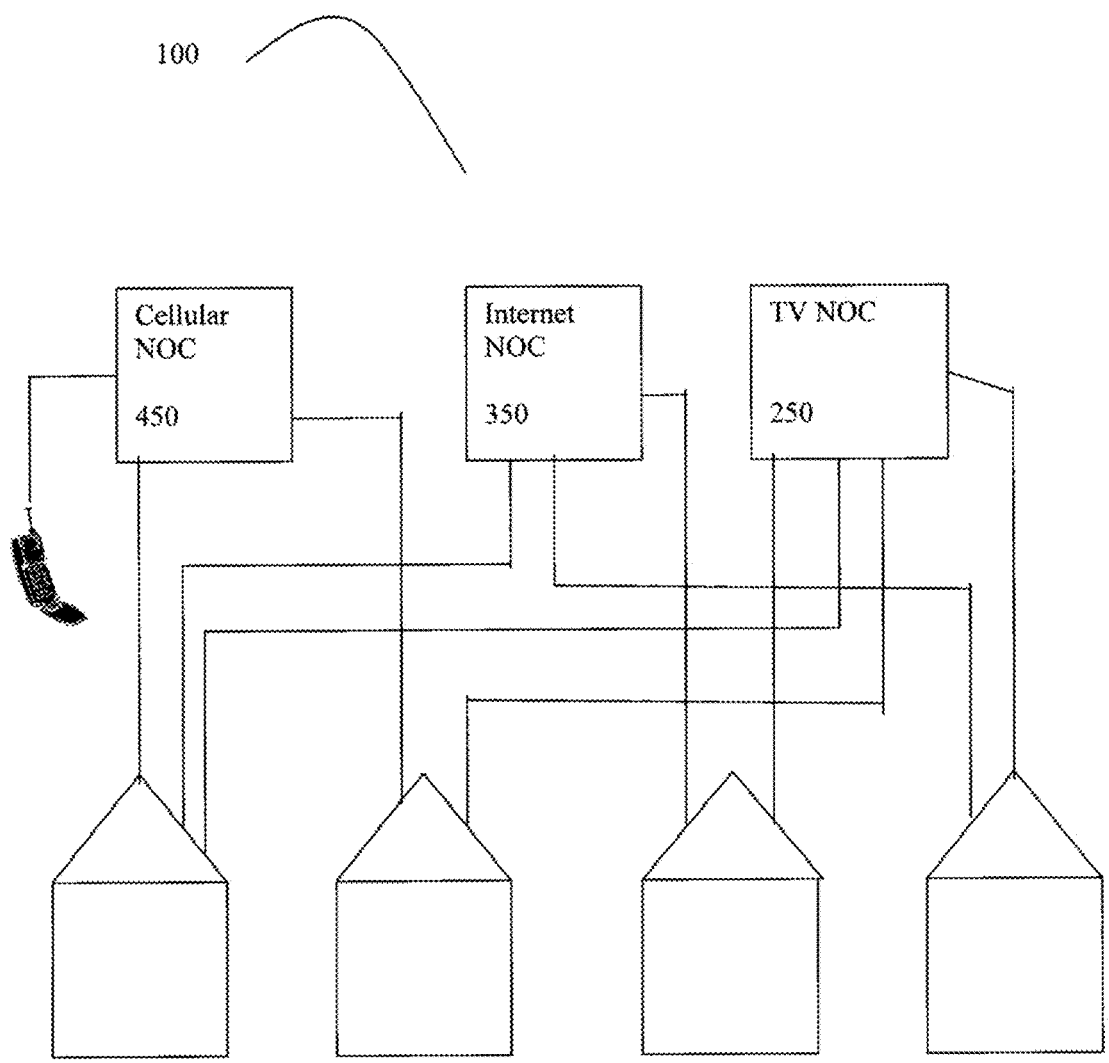
FIG. 1 is a block diagram illustrating a prior art network services a number of user devices with both wireless and wired (landline) connections.
Figure 2:
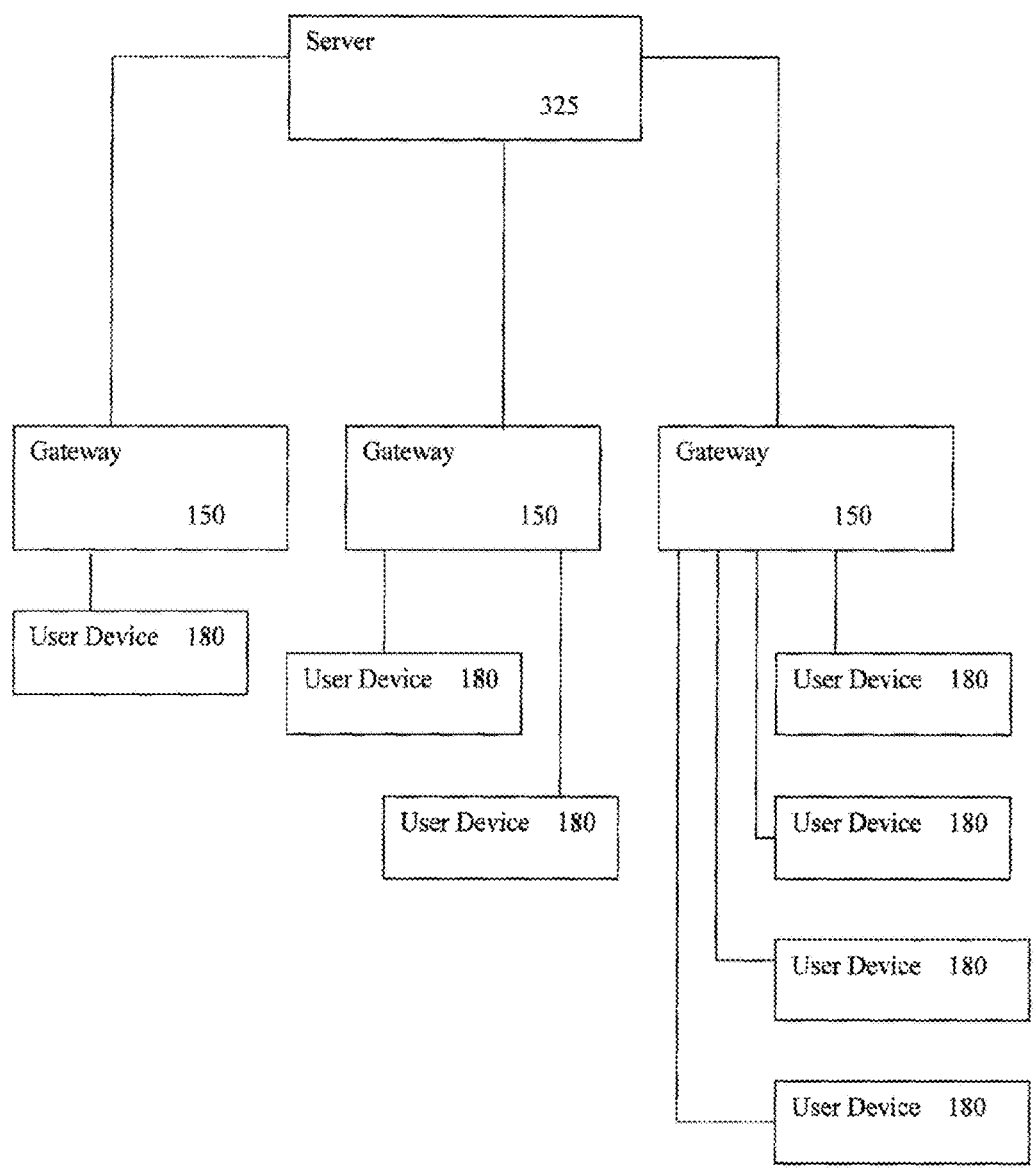
FIG. 2 is a block diagram showing the gateway in communication with a variety of user devices at a variety of homes.

The embodiments described herein are directed at creating a network (or "micro-cloud") of service nodes, referred to as gateways 150, with each gateway being a configured CPE for servicing a home or other residential unit (such as a dorm room or apartment), as seen in FIG. 2. Each gateway acts as one node within a content distribution network ("CDN" 15), and is used to forward content to one or more user devices 180 that are registered to use that particular gateway 150. The CDN 15 formed by the gateways 150 and by the user devices 180 registered to each gateway 150 constitute a local area network. Gateways 150 are able to communicate with each other throughout the network, either directly, or through server 325.

Figure 3:
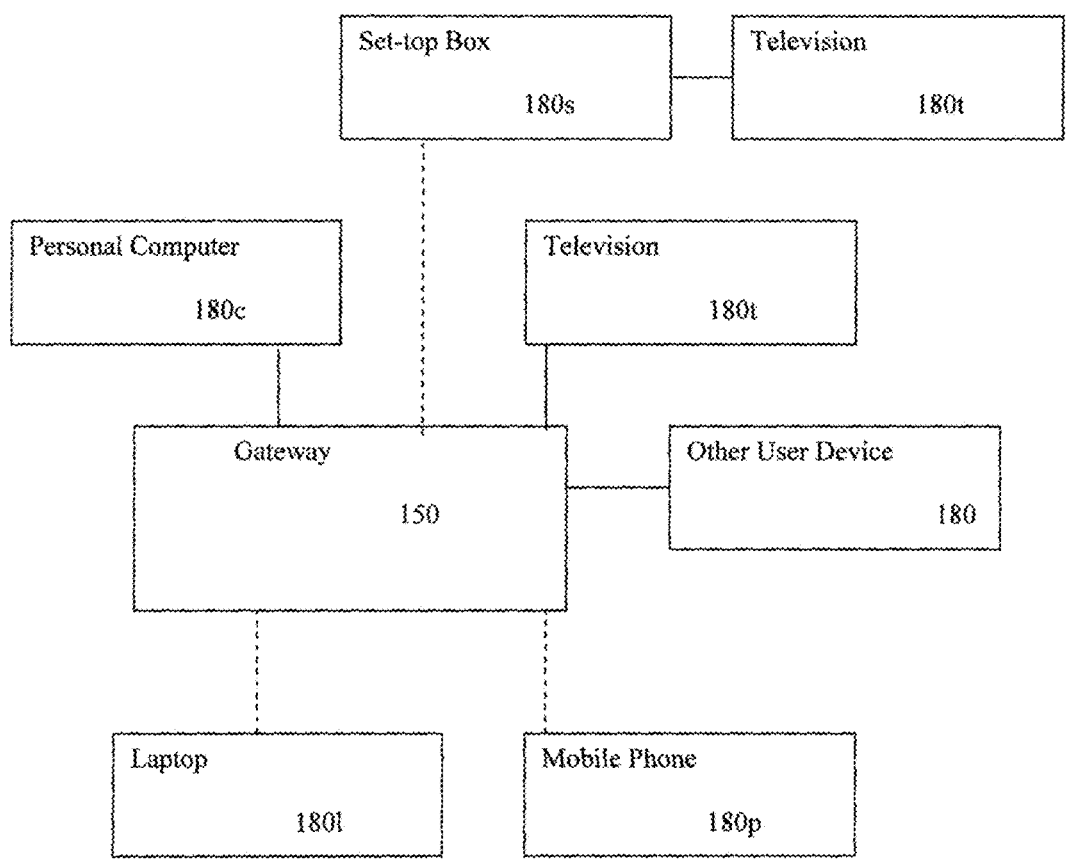
FIG. 3 is a block diagram showing the gateway acting as a hub in communication with a number of user devices.

As seen in FIG. 3, gateway 150 may have the base functionality of a conventional set top box and is also the service provider's controlled node that can run applications for users and user devices 180 registered at the premises served by gateway 150. For example, as shown in FIG. 3, gateway 150 is connected to TV 180*t*, mobile phone 180*p* (which may be a smart phone), laptop 180*l* and personal computer 180*c*. Gateway 150 may be in communication with a set top box 180*s*, itself connected to a user device 180, such as TV 180*t*, that functions as a slave unit. Gateway 150, depending on the user device's connectivity (for example, if the user device can connect to the CDN 15 through a wireless connection that is faster than the user's current wired connection, gateway 150 will transmit data through the wireless connection), retrieves content for the user devices 180 and provides usage information to the operators. In FIG. 3, wired connections are shown in solid lines and wireless in broken lines. This architecture eliminates the need to run costly NOCs, and allows users to access data of many types, such as multimedia messaging, wireless VoIP, streaming video, video telephony, corporate applications, email, and wireless gaming.

2. Gateway Components

Figure 4:
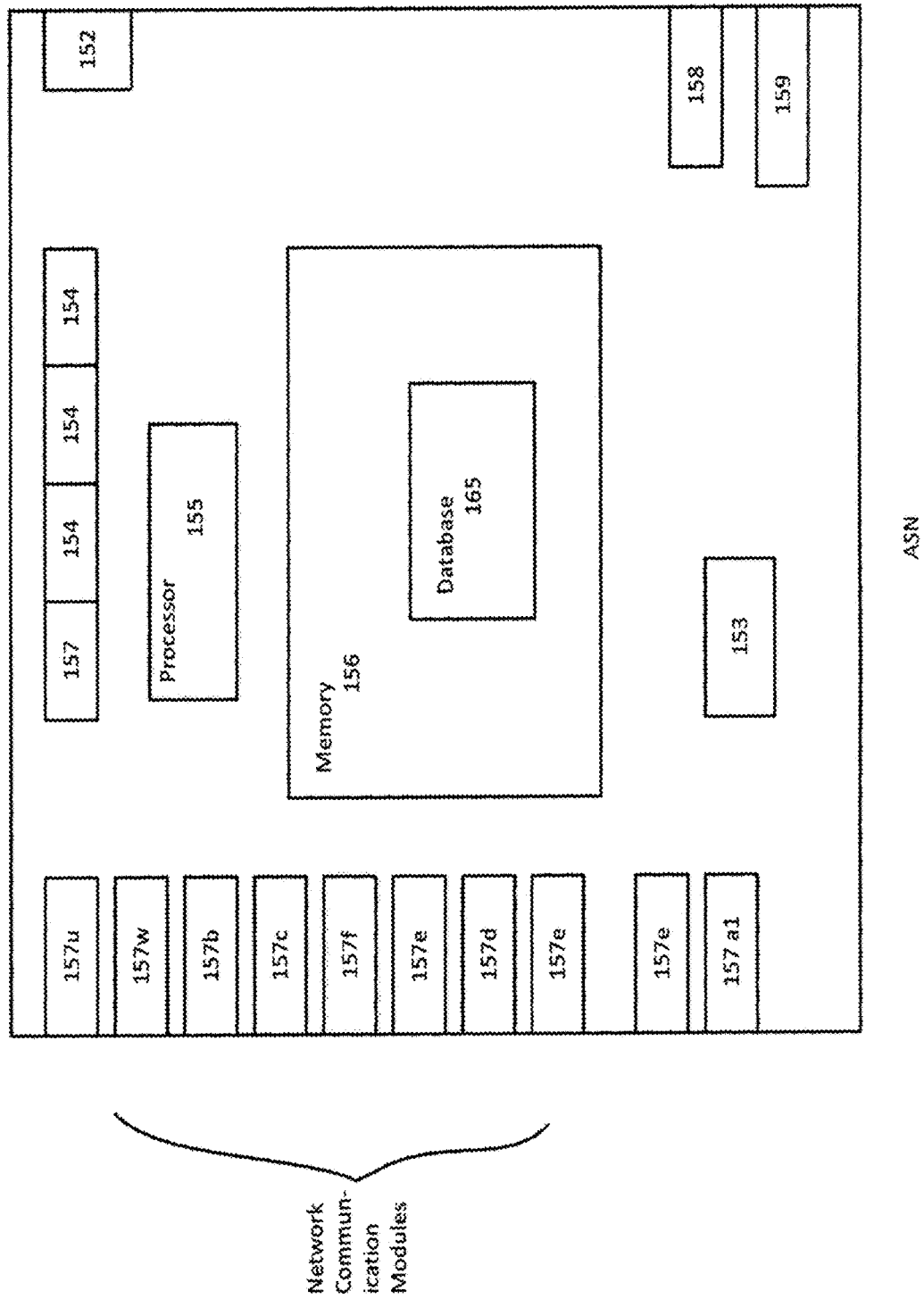
FIG. 4 is a block diagram showing selected components of a gateway according to the invention.

As shown in FIG. 4, each gateway 150 includes processor 155 that executes software, including a variety of software modules, some of which are described below. The processor 155 is coupled to memory 156 in the form of both permanent (flash memory or hard disk storage) and volatile stores (random access memory). Database 165 is typically stored in memory 156. The operating system of the gateway 150 and the various modules described below are stored in the permanent memory storage such that gateway 150 can be powered on and off without having its software erased. During execution, parts or all of the software stored in the permanent memory store of the gateway 150 are copied into the volatile store where it is executed by the processor. Gateway 150 also includes network communication modules 157, such as Wi-Fi port 157*w*, a DLNA port 157*dl*, Bluetooth port 157*b*, USB port 157*u* (there may be several USB ports 157*u*), cable modem port 157*c*, femtocell port 157*f*, and Ethernet port 157*e* (and may include several Ethernet ports), DSL modem port 157*d*, speaker 158, and control interface 159 (with an IR interface, and optionally, selectable buttons for use by users), that are in communication with processor 155 and that are used to send and receive content. A WiMax port may also be included. Gateway 150 also has video and audio inputs and outputs 152, and may have several types of video and audio inputs and outputs (e.g. Svideo, composite, component, HDMI, optical, etc.). Gateway 150 also has a power supply 153, and is typically plugged into a nearby outlet to receive power, and a plurality of TV-tuners 154.

TV-tuners 154 accept RF band cable or antenna TV analog or digital input. Preferably four or more TV-tuners 154 are present and they support VOD and EPG (meaning QPSK demodulation is required). TV-tuners 154 may support satellite TV.

Ethernet port 157*e* enables a standard interface connection to the home IP LAN for media content sharing between gateway 150 and user devices 180. Ethernet port 157*e* operates as a router and preferably at least four (10M/100M) ports are available. The Ethernet ports 157*e* providing routing, NAT, DHCP and DNS forwarding and support all IP device connections, such as network printers and VoIP phones.

Video formats supported by gateway 150 include Svideo, composite, component, HDMI, MPEG-1, MPEG-2, MPEG-4 (H264, DivX, Xvid and Nero Digital), Sorenson (used by flv and quicktime), WMV (Windows Media Video), VC1 (WMV 9 based, Blue Ray, HD-DVD), RealVideo, DivX, Xvid, FFmpeg and 3ivx (a different implement of mpeg4 part 2).

Audio formats supported by gateway 150 should include 7.1 Dolby Digital (A/52, AC3); stereo, DTS Coherent Acoustics (DTS, Digital Theatre System Coherent Acoustics); MP1, MP2, MP3; AAC (MPRG-2 Part 7 and MPEG-4 Part3) and Linear Pulse Code Modulation (LPCM, generally only described as PCM).

Wi-Fi port 157*w* should support 802.11b/802.11g and other features such as security (WEP, WPA, and WPA2). Gateway 150 will serve as a Wi-Fi access point. A web interface should be provided to configure the Wi-Fi including set-up, maintenance and trouble shooting.

Bluetooth port 157*b* may support Bluetooth 2.0 and keyboard and mouse features. Human Interface Device (HID) may also be supported as could be a mobile phone connection or headsets.

USB ports 157*u* enables gateway 150 to host a connection to user devices 180 or peripheral devices. USB 2.0 may be supported and at least two USB ports 157*u* should be available. USB ports can be used to support devices such as digital cameras, digital camcorders, USB Hard drives, USB Flash memory, portable Blue Ray or DVD drives, GPS systems and the like.

Keyboard and mouse connections may be supported via USB ports or Bluetooth.

Gateway 150 may be provided in a form fitting case (not shown) to fit on a typical TV shelf, and may be sized comparably to other and video components such as a Blu-ray player or amplifier. The front panel of the case should include a reset button (optionally reset button may also be, or alternatively be, a software function). The front panel should also include switches such as On/Off status; Recording/Replay status; Current Channel Number; any pre-set alerts, the current time, and other displays (as digits or icons) and an IR window for receiving input from remote controls. The ports and connectors noted previously may be placed on the back panel of the case.

In operation gateway 150 will typically have a power input of about 100-240 V AC 50/60 Hz, and a power consumption of about 20W. Gateway 150 should be operable in temperatures from 32 to 105° F. (0 to 40° C.) during normal operation.

3. The Software:

The software within gateway 150 should have the capability of receiving TV input and regular Internet content in all supporting protocol levels, provide regular VoIP services, and support connectivity functions including Ethernet (including when the connectivity is initiated from cellular access), WLAN, DLNA and FemtoCell.

Basic software services refer to a set of software services that are fundamental building blocks for the rest of the software services. The basic software services are a set of software engines which would either provide a service and/or the information necessary for enabling delivery of other applications. For example, streaming TV content and providing transcoding to a user mobile device is a service, whilst profiling a customer in terms of their interest in content, and usage patterns, is a function enabling a personalized advertisement insertion service. The basic software services are described as software "engines", which are described below.

The Activation Engine is responsible for activate certain services that gateway 150 is authorized to serve to users. Such services include:

a. TV→Enabled/Disabled Channels and bundles that users are authorized to view
 b. Internet→Enabled/Disabled
 c. VoIP→Enabled/Disabled
 d. Network connectivity→Enabled/Disabled (means for a remote reset, configuration and troubleshooting)

The activation engine 200 is responsible for registering users, devices and services to which users have subscribed. The input parameters for activating gateway 150 may be through a set of web interfaces. This interface should follow the existing operator's activation flow. A master interface defines the activation fields and account setup. The activation engine runs on the gateway while the activation field operates and runs by first the customer service and then by user device 180 after the activation is enabled, for example for activities such as device registration and/or even activities such as parental control for a user device 180.

Users may have more than one gateway 150 per household, for example to take advantage of more hard disk space or TV tuners. In such a case, the gateways will function in a master-slave arrangement.

An Authentication, Authorization and Accounting Engine (AAA-E) is responsible for providing the authentication and authorizations of the gateway 150 registered users based on their subscription. The authentication process must follow the broadband operator's authorization process. This typically includes combining device_ID (an identifier associated with a user device), username, password, NEI number or other information. The user must be distinguished from the user device 180 that is being used. For example, a registered wireless data card may be used by two different users at the gateway 150 site. While the card is the same, or even the laptop is the same, the users may be different. Therefore a combination of wireless network card, device id, and username and password is required to identify and distinguish the users and therefore their preference and their subscription to a service. The accounting engine is also responsible for some of the billing and audit services. It also keeps track of service usage based on the subscription. The subscription could be based on any combination; examples include: accessing TV only; Internet only; limited number of user device access; limited access means; Ethernet, Wi-Fi, FemtoCell, and/or cellular along with other service subscriptions. Any service provider accounting function may be included in Authentication, Authorization and Accounting Engine 210.

A User Characteristics Catalog Engine (UCC-E) tracks information about registered users of user devices 180. Personalization is a process by which the content pushed to one user could completely be different from that pushed to another user. In order to be able to push personalized content to a user, gateway 150 must be able to characterize users' behavior. Characterization of users could start from user segmentation, which means that the user population is subdivided, into more or less homogeneous, mutually exclusive subsets of users who share common user profile characteristics enabling the possibility of providing them with a more personalized content. The ultimate objective of the User Characteristics Catalog engine is to be able to characterize the user in terms of static and dynamic attributes of the user. Static attributes are those that do not change rapidly, for example gender, age, marital status and income status. Dynamic attributes are those which change more rapidly and which relate to the sensitivity of each user toward their surrounding social events such as politics, fashion, news and the user's location. The latter is a characteristic with a substantial impact on users' preference, as for example the content a user is interested in when the user is mobile using a small mobile user device is very different than the content that a user is interested in when they are using a larger screen user device.

The UCC-E should work using a definition dictionary which could be updated, extended and modified as needed. For example, if a user was being characterized based on two parameters, a third parameter could be added or replaced by one or both parameters and the characterization should be continued based on the new definition dictionary. The UCC-E should incorporate an artificial intelligent model whereby it continues learning about users' behavior and usage patterns over time, and therefore be able to produce much more accurate characterization of the user.

The User Tracking Engine (UT-E) contains the information about the active user session's user device 180, identity, time, date, activity and duration, context, location, and the network connectivity and the proximity to gateway 150, which is provided by routing measurement functionality in the UT-E to determine the optimum path for data transfer and closest content access. This function may be performed with a client agent on the user device 180 or other means of measurements using lower protocols to avoid client software on the device. The UT-E also maintains information about accessed content, including TV channels, PVR use, VoD, Internet sites, and even the type of content (e.g. video, text and/or mixed). The UCC-E uses this information as a set of parameters in order to characterize the users. The history of the user is used by the UCC-E. User tracking may be configurable, for example, user device ON/OFF; TV activities only; Internet activities only; or video activities only.

The Content Personalization Engine (CP-E) uses the UCC-E and the UT-E. The CP-E uses an automatic intelligent search engine that finds matched content for the user. The CP-E may be a software engine within gateway 150 or may be an external service engine provided by the service provider.

An internal CP-E resides within gateway 150 and interfaces with both the UCC-E and the UT-E. The CP-E automatically searches the web and content producers and distributers on behalf of each registered user of gateway 150. The CP-E indexes the content and has the content prepared for the user.

An external CP-E may be a large personalization server on the service provider network for content distribution, for example from advertising companies with relationship with the operator. This external CP-E receives information from the UCC-E and UT-E (through common and single interfaces). The CP-E then matches the content, in this case advertisements, and pushes it to gateway 150.

In a combined model, the internal CP-E could be considered as an agent of an external CP-E. In this case the internal CP-E supports the external CP-E interface. The internal CP-E receives information from the UCC-E and UT-E and communicates with the external CP-E for receiving the matched content. The external CP-E may locate matching content from the other gateway 150 users in different households that share the same interest and are within the same social community authorized by the users. The external CP-E could be a global service that interfaces with many content distributers for finding matched content.

The decision making rule of the internal CP-E should be based on a configurable set of rules which could be updated and modified remotely.

An Intelligent Search Engine (IS-E) is an automatic search engine which fetches the users requested information and searches and compiles the information on behalf of the user. For example, if a user is traveling to Las Vegas and inputs its trip itinerary to the IS-E, the IS-E will find the location of restaurants, car rental agencies, and places to visit based on the proximity, interest and time line of the user. The IS-E collaborates with the ICT-E (described below) to transcode and arrange the content to meet the user's profile.

A TV Transcoding Engine (TVT-E) is responsible for transcoding a stream to the user based on characteristics of the user collected by the UT-E. The TVT-E is therefore one of the users of the UT-E and also interfaces with the TV receiver. The TVT-E must transcode and rate shape the stream to meet the user's particular user device 180, access network type, speed and proximity to gateway 150 (both in distance and/or number of hubs). The TVT-E is able to stream the live received TV feed per channel to each user device 180, and both a PVR stream and VoD stream. The latter may require the appropriate subscriber package. As an example if a user has purchased a VoD service, the user may only be allowed to watch the service on any of his/her user devices 180 for a period of 24 hrs, or on just on a single device at a time. If the user may watch a portion of the movie on one user device 180 and another portion on a second user device 180 then the TVT-E tracks the used content and the content usage policy and subscription. A similar process may be used for PVR content.

For the purpose of digital right management, there may be client software on mobile phone and computer user devices which remove content proportionally as the user plays the content in case of PVR-d and VoD content which is being viewed. The policy of DRM is an additional layer over the top of all engines which decides on the sharing mechanism of digitally protected content. Note that for the DRM purposes it may be useful to have software installed on the client side.

The Internet Content Transcoding Engine (ICT-E) is a service provider as is the TVT-E, but the ICT-E transcodes internet traffic. The ICT-E also uses the UT-E and provides the content transcoding to the user based on their current user device, software running on the user device, network type, speed, location and proximity.

The TV/Internet Content Mix Engine (TVIC-E) is responsible for mixing Internet based content with TV content. The TVIC-E fetches and receives the content which needs to be displayed on TV as the user watches the TV. This engine has a GUI engine that communicates with the ICT-E and the TVT-E and the TVIC-E has the task to select the format of the content for display based on the user device and preferences.

The Content Sharing Engine (CS-E) is responsible for sharing user content amongst other users. The CS-E uses the UT-E to determine the current user's profile and if necessary uses the ICT-E for transcoding the content.

The Master Security Engine (MS-E) is responsible for security related to gateway 150, including intrusion detection, authenticating users, authenticating any access and transactions with outside sources, and encryption/decryption of streams.

Figure 5:
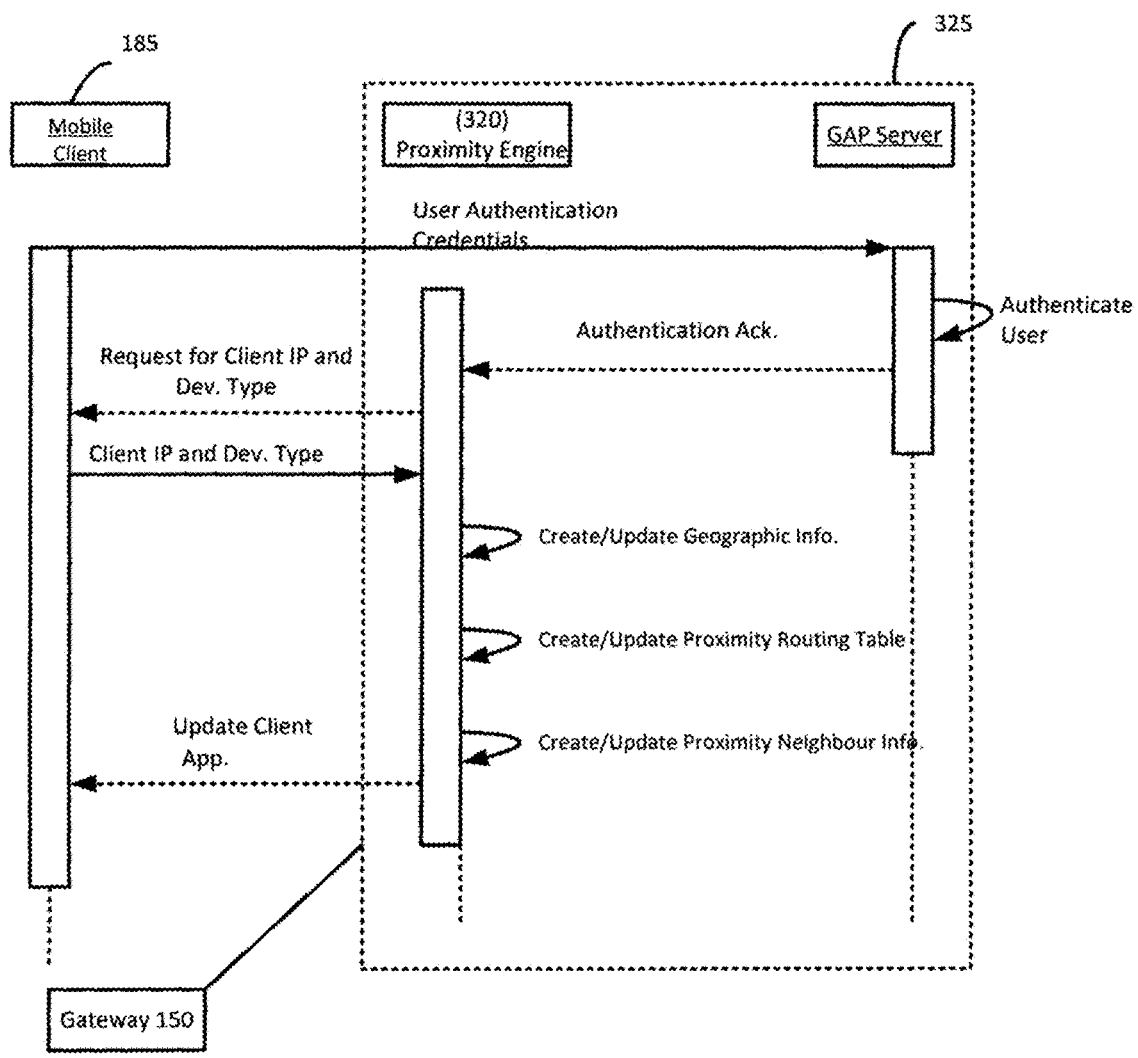
FIG. 5 is a workflow drawing showing the proximity detection process according to the invention.

As shown in FIG. 5, Proximity Engine (P-E) 320 is responsible for measuring the proximity of a mobile user device 180 (designated as "mobile client" 185) to gateway 150. This includes the number of hubs to the user device. P-E 320 is also responsible for identifying the best and shortest path to the mobile user device. P-E 320 will also use the geographic location of the user device which is sent to gateway 150. Optionally, client software may be installed on the user device to communicate with P-E 320.

As shown in FIG. 5, the user device and user credentials are first authenticated by Global Access Portal server 325. GAP server 325 is responsible for authentication of any gateway 150 local or remote users, and determines the user's registered location. Once authenticated P-E 325 requests the mobile client 185's IP address and type of user device 180. With that information P-E 320 determines the geographic information, a proximity routing table and a proximity neighbour information table. The proximity neighbor information is a table of information related to a specific gateway 150 and any associated user. This table determines the closest node (or source of information) to provide the content for the requesting mobile client 185 (or gateway 150) with the best possible quality of services.

The transcoding of TV/Video content varies depending on the particular user device 180, taking into account of the user devices' physical and performance constraints such as screen size, CPU, memory size, and audio/video codecs. Furthermore, video stream content is transrated and rate shaped in light of the user device 180, access network type, speed and proximity to Gateway 150 (how far and/or how many hubs to the user).

Transcoding is used when gateway 150 reformats content during TV broadcasting, TV Streaming, TV peer to peer, TV tuner sharing to other user devices via Ethernet, Wi-Fi or Bluetooth. It is also used when content is being transferred from gateway 150 to user devices. For example, if video content is transferred from gateway 150 to mobile phone, gateway 150 first transcodes and then transfers. The transcoding and transrating process should be invisible to a user.

Gateway 150 provides an interface that allows users to transcode and save their contents in different formats; making it cross-device transferable. The interface will be called from each user account. It can be started and stopped at any time based on availability of Gateway 150 resources. It can convert the content and save it on Gateway 150 hard drive for further transfer.

Gateway 150 also reformats Internet content for the user device, by using content inspection, understanding the HTML content, downloading the content, and converting it to the appropriate format. Gateway 150 can combine content for the TV display and Internet, by fetching and receiving internet content, transcoding the content to the most suitable format for TV display, and mixing up with TV content; and displaying both on TV. A split screen may be used for multiple purposes e.g. widgets, advertising, menus, keyboard, game, or Internet browsing.

User owned content may be shared between user devices. There are web portal service providers and social networking service providers which allows users to create accounts and share their own contents with other users within their network. This service should support the interface to the operator's selected provider of such service for the content access. Also user tracking information to determine the current user's access profile should be considered and transcoding completed if necessary.

Gateway 150 allows content sharing and saving amongst registered user devices 180, such as TV displays, laptops, PCs, mobile phone devices and gaming consoles. Gateway 150 can act as a storage device to save content. Gateway 150 also allows file transfer between user devices via Ethernet, Wi-Fi or Bluetooth connections. For example, files may be transferred from a PC to gateway 150 or from gateway 150 to a PC; or to or from a mobile phone to gateway 150, etc. Files may be uploaded or downloaded directly to gateway 150 from the Internet.

Content files may be transferred between gateway 150 and USB devices. For example, gateway 150 can be used to store personal digital media contents from digital cameras or iPods (image or MP3 files) onto gateway 150's hard drive. Gateway 150 can then be used to organize the content, for example, by managing images, creating playlists and modifying properties, such as the format, of the saved content.

Gateway 150 may use auto detection with certain user devices. In this case, the user will be prompted to provide certain parameters such as user account, location and content management parameters, and then the transfer begins.

Alternatively, the user can specify when files are to be transferred. In this case, the user selects files to import and is shown a set of icons appears representing different types of content. The user selects the appropriate icon, is then asked to connect the user device. The user connects the device, sets the parameters for the transfer and the transfer begins.

A user is able to view, modify and play saved media content on the hard drive of gateway 150. Options could include creating a slideshow, creating a playlist, managing mages, playing a music library of a user device connected to gateway 150, modifying properties of the content, or organizing the content.

Gateway 150 has several ports, such as USB port 157u, that allows connection of external hard drive and an on-screen interface facilitating the file transfer. The hard drive can be connected and called by any user. It can be used at any time and is user based. The interface allows the user to store allowed contents. The external hard drive may be auto partitioned based on number of users of gateway 150. Users can also modify properties of the external drive; organize the contents thereof; and use applications to create photo albums, music libraries, and video libraries.

Gateway 150 may also allow connection of an external home theatre audio system or an external DVD player.

Gateway 150 also may allow connection of user devices 180 that are digital media sources, such as cameras, camcorders, iPods etc. An on-screen interface should be available to facilitate managing the connected user device 180. The user can transfer allowed content, play a music library of the connected user device, modify properties of the content on the connected user device, and organize content on the connected user device.

Gateway 150 has an internal Wi-Fi LAN router and port 157w, and provides an on-screen interface for basic and advance configuration. It can be configured by gateway 150 administrators and can be used at any time.

Gateway 150 has a pre-set interface that allows insertion of account information and instant connection to satellite radio providers such as XM or Sirius Radio. The user inputs an account setting and gateway 150 connects to radio account center, allows channel changing and can transfer the signal to other registered and capable user devices 180 connected to gateway 150.

Gateway 150 can display an on-screen full keyboard on a user device. It can be called by any user and used at any time. It allows users to imitate typing action and type text commands for gateway 150. It can be used for searching, and can be toggled between a full keyboard and a phone pad keyboard.

Adapted versions of the user interface for a PC or a mobile phone can be used through gateway 150 and display on different user devices 180. The interface can be called by any user and used at any time.

Gateway 150 may be able to allow users to store content on extended online storage provided by the operator. Such storage access can be connected and called by any user and used at any time. It requires an Internet connection and can use a FTP account or HTML or Flash GUI.

Gateway 150 user interface engine (UI-E), which partially feeds UCC-E, determines the proper zoning of a screen 600 by type of request, type of content, availability of information associated to the request/content and the eligibility of user regarding to view the different level of the information. CP-E also is involved in this process as is a media object database containing information related to the object, object owner and also the type of request which is initiated by the user. Based on this information, UI-E determines how to split screen 600 into several zones.

Figure 8:
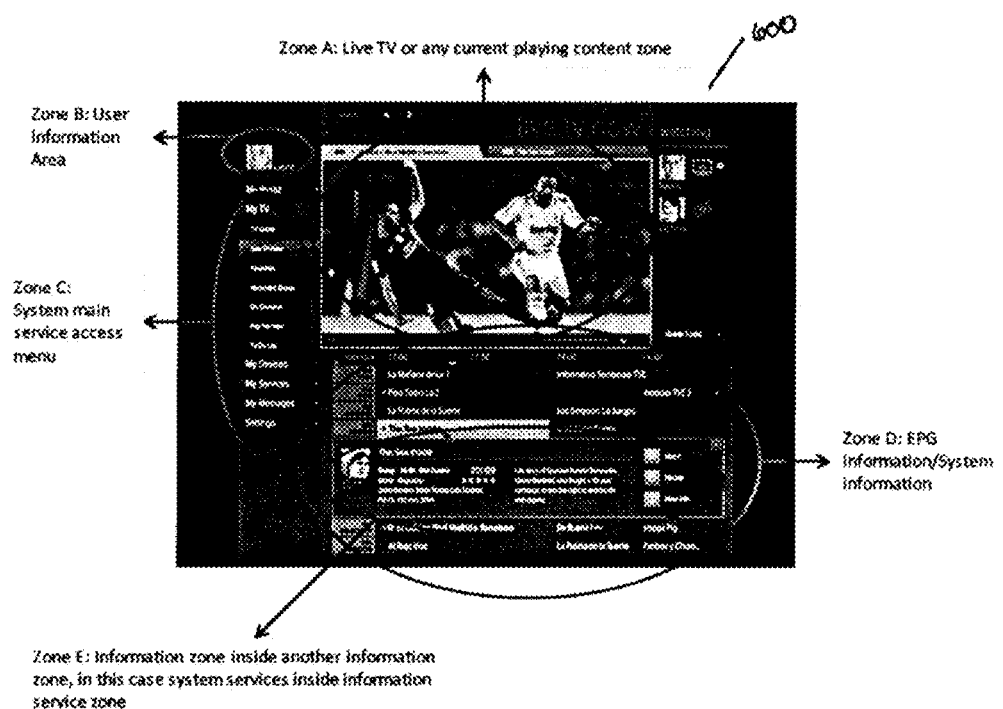
FIG. 8 is a drawing showing a split screen function according to the invention for use on a mobile device.

As shown in FIGS. 6, 7 and 8, gateway 150 may displays into several zones to view TV content, Internet browser and/or some widgets on display 600 at the same time. UI-E can split display 600 into 2, 3, 4 or more zones. Each zone may be assigned to different user. Each zone may individually access a menu and receive commands. UI-E can automatically fetch info regarding the in progress content from Internet and preview it in the browser inside the assigned zone and can enable users to access other viewers' feedback and ratings regarding any targeted or in progress content in an assigned zone.

FIG. 6 shows a TV display 600 split into four zones. Zone A displays information generated by gateway 150. Zone B shows a live TV stream. Zone C shows a keyboard for allowing the user to enter data. Zone D shows information about the user. Zone E shows some advertisements to the user provided by gateway 150.

FIG. 7 shows a TV display 600 split into three zones. The current content display (which may be television or another source) is displayed as background using the entire display 600. A second zone displays advertising and information about the current content. A third zone provides a menu and system service information.

FIG. 8 shows a mobile user device, such as a smart phone, with display 600 split unto several zones. In this case zone A displays a video stream, zone B user information, zone C system services menu, zone D, an EPG display and zone E system services within the EPG zone D display.

Gateway 150 may be used for accessing personal messages, including emails, text messages, and allows users to twit and stream access to Twitter accounts. Similarly, gateway 150 can be used for accessing social networking profiles and allows users to access their preferred social networking accounts and display them on registered user devices 180.

Gateway 150 can also be used for sharing content, as users can share their digital content, such as digital images, videos or recorded TV, with other users, including users of different gateway 150 devices.

Gateway 150 also has several other software services available to users, including email services (serving registered user accounts); virus protection (servicing registered user devices); Internet favorite synchronization; and mobile keyboard mapping to TV which allows users to use their mobile devices (iPhone soft key or windows mobile hard key) in same fashion as if they had a full keyboard in front of TV, i.e. the mobile user device is used as the keyboard for accessing Internet on the TV display.

Gateway 150 can interact with a mobile user device 180 that uses a remote control app to control a television or other display. The use of the remote control app 900 allows uses to take advantage of the touch screen functionality of most smart phones.

Figure 9A:
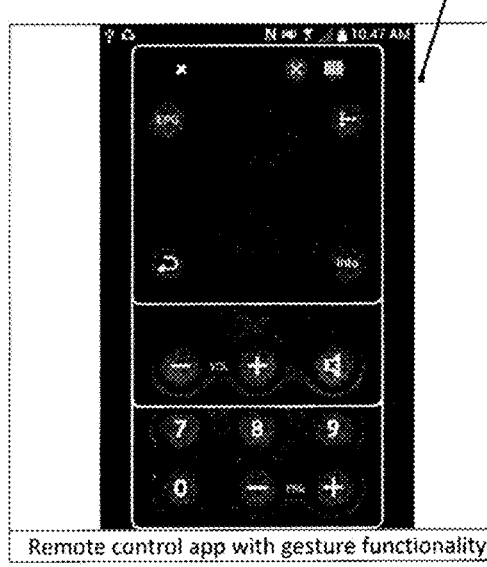
FIGS. 9a and 9b is a drawing showing embodiments of a remote control app according to the invention.
Figure 9B:
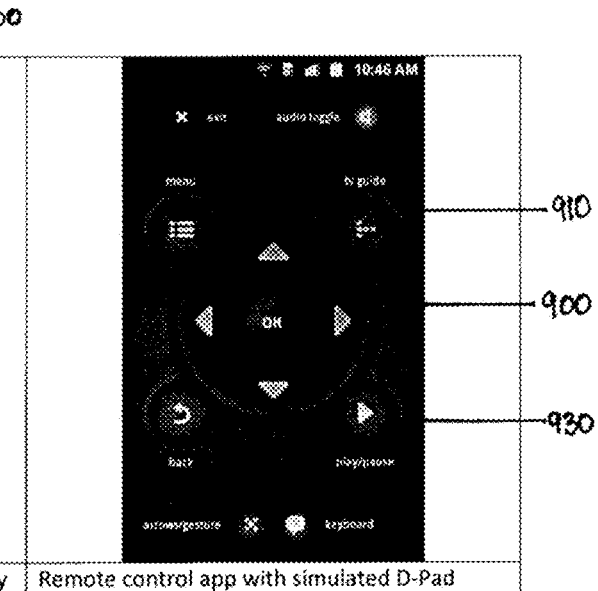
Figure 10:
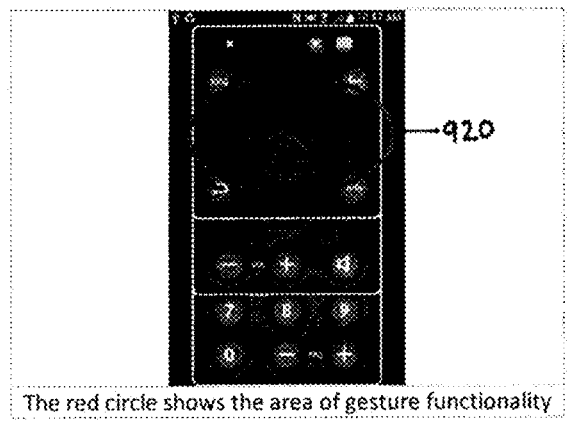
FIG. 10 is a drawing showing the embodiment of FIG. 9a, detailing the area of functionality.

The remote control app 900 allows users to use a gesture action (in addition to using the more traditional Left, Right, Up, and Down buttons (known as a "D-Pad") 910 to navigate TV menus and screens as shown in FIGS. 9*a* and 9*b*. The display of the smart phone appears similar to that of a conventional remote control. The input area for a touch-screen display 920 using the remote control app is shown in FIG. 10 which allows for gesture functionality. Similar to any regular physical remote control, the remote control app 900 has control buttons 930 for audio and video content, and in addition user can type on any certain data entry fields 940 on the TV screen or mobile screen.

Figure 11A:
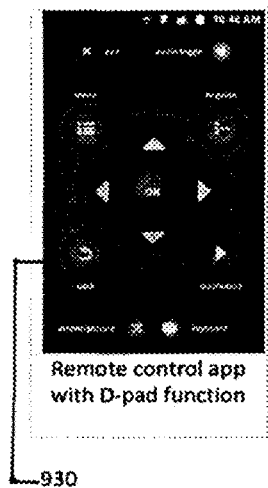
FIGS. 11a to 11d are drawings showing different states and features of an embodiment of the remote control app according to the invention.
Figure 11B:
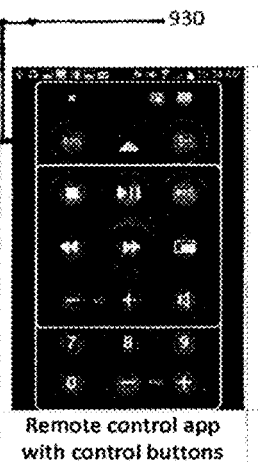
Figure 11C:
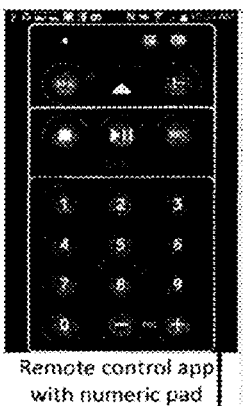
Figure 11D:

FIGS. 11a through 11d show different displays presentable on the smart phone using mobile app 900 for different purposes. FIG. 11*a* shows the D-Pad; FIG. 11*b* a traditional audio/video control layout; FIG. 11*c* a numerical keypad; and FIG. 11*d* a keyboard. Remote control app 900 can use the native capability of the mobile devices with a touch screen as a data entry device. The user can use the native keyboard of the mobile device to type text or any other type of data entry purpose (e.g. chat, sharing comments or etc.).

Remote control app 900 can recognize its locations and determine if the user is sitting in front of TV, or is at home close to TV or not. It will disable when user leaves the home is far from the TV. This functionality prevents remote user app 900 from interfering with a user who seats in front of TV and interacts with the TV using its regular remote control.

Gateway 150 can also provide Peer-to-Peer services, and interface with a Webcam to allow users to use the webcam for video capture, monitoring and video chatting and remote control services, and can allow users to use their mobile phone as a remote control for gateway 150 through a browser interface.

Gateway 150 includes software to perform a number of maintenance tasks, including: Auto Defragmentation, for periodic automatic disk check and defragmentation; Backup and Resource Center, available online or included with gateway 150 to auto-backup vital user settings; Interactive Help Center, which is an interactive online library of resources to help users find their way around features and issues; and Remote Assistance, which allows users to contact a customer care representative via onscreen interface.

User Content Characterization

The UCC-E operating in gateway 150 provides the advantage of characterizing users on the edge of the network for all users at single premise. Users at a single premise often have overlapping interests and that similarity assists in analyzing each user more accurately. This means that more accurate information can be provided to the operators about the users which allow the operators to take ownership of users most valuable information from an advertising perspective; their characteristics, which would generate more revenue from the advertising industry.

User characterization is the analysis of a user's activities on Gateway 150 and determination of a user pattern so as to identify the content that he/she is interested in. It characterizes a user's interest and preference in his/her daily life through his/her activities using Gateway 150. Characterization is based on current condition and also historical data. The characterization model must continue to learn about users' behavior and usage patterns over time and therefore be able to produce more accurate characterization for the users. Characterization will be done on per user account basis The UCC-E is one of the software engines within the middleware running on gateway 150. Gateway 150 handles the entire user's traffic flow through whether a user's mobile phone is connected through a cellular access point, or the user is at home, or is on an Internet cloud. Therefore gateway 150 can characterize a user over time and "learn" about each registered user at a premise gradually. To accomplish this characterization, gateway 150 must be aware of the context of the user. Context includes any information that can be used to characterize the situation of a user. As an example the UCC-E may characterize a user based on his/her location, the time, type of device, access network and a typical activities within that context (state). The context (state) of a user defines the type of activities.

The UCC-E builds a tree, which describes the user's context. The CP-E uses these characteristics to find the content, which is most usable and is of interest to the user. To match the content the CP-E must distinguish the management, updates and matching of the content to reusable contents such as news, movie and advertisements. Both the UCC-E and CP-E are highly configurable in terms of algorithms, thresholds and weights.

The UCC-E determines the characteristics based on the current condition, and it also has to take into consideration the history of the user. Therefore both current condition and history are input to the UCC-E. Some social variables also impact the user characteristics. For example, a holiday event for two users within the same neighborhood could have different importance and effects on them. At the same time while someone may normally not be interested in politics, but an event may temporarily change this, for example the 2008 US election for Canadian residents. This means that the periodic social events, such as holidays, and instant social events, such as election, are also inputs to the UCC-E.

Characterizing a user includes defining the content description which users use, such as title, keyword, category, time and location; the user description, such as user preferences and history; the user context description, such as time, location, activity, device profile, active network access profile; and the user description extension, such as gender, age and activities.

Over time, the UCC-E can detect a typical user session from an atypical user session. One way to detect the atypical session is to use Mahalanobis distance statistics in the user session space. Detecting the outliers (atypical) is important and valuable for cleaning the noisy user session history and avoids characterization based on random or false information. The user history is taken into account since if a session is typical it is happening in a regular and periodic model and an atypical session is no longer atypical but is a typical session should it have this pattern within a certain time, which is then characterized as such by the UCC-E. The UCC-E should also detect a page request as a user action or a system or automatically generated web action, which categorizes content description as that which a user has viewed (pushed, or pulled).

The UCC-E includes a Characterizer Module which tracks a user's browsing behavior down to individual mouse clicks such that advertisers, through gateway 150, can personalize their advertised content/products. This module should distinguish and analyze user data and the usage of such data.

The UCC-E also includes a Data Analyzer module which distinguishes the types of data that user is accessing. As an example the data could be categorized in the following categories:

Content: This is the real data that the site was designed to deliver and convey to the users. This type of data is consists (usually) of the text and graphics.

Structure: This is the data that describes the arrangement of the information within the page.

Intra-page structure information includes the arrangement of various HTML or XML tags with a given page. This can be represented as a tree structure, where the "html" tag becomes the root of the tree.

Inter-page structure information is hyper-links connecting one page to another.

State: This is the data that defines the frequency at which the data changes, e.g. a breaking news headline vs. the full story of the headline.

Usage: This is the data that describes the pattern of usage of content, such as
IP addresses,
Page references, and
Date and time of access
User location
User device
User access network Since the data is being analyzed on gateway 150, the performance of the information transfer and content value could be collected at the same time, such as the time which user spend on each page or even viewing the content. Note that "D-Box" in this acts like a proxy since it is the point of contact for all users within the premise. Higher performance could be realized by ability to predict the future page requests correctly and accurately.

Figure 12:
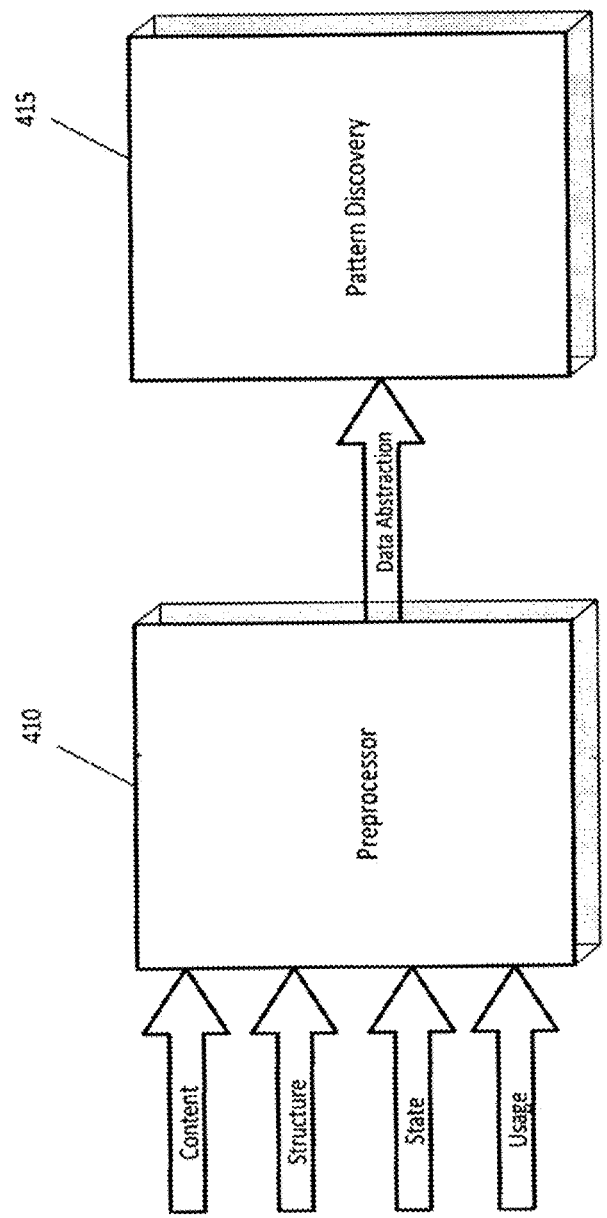
FIG. 12 shows the data analysis steps used in user characterization.
Figure 13:
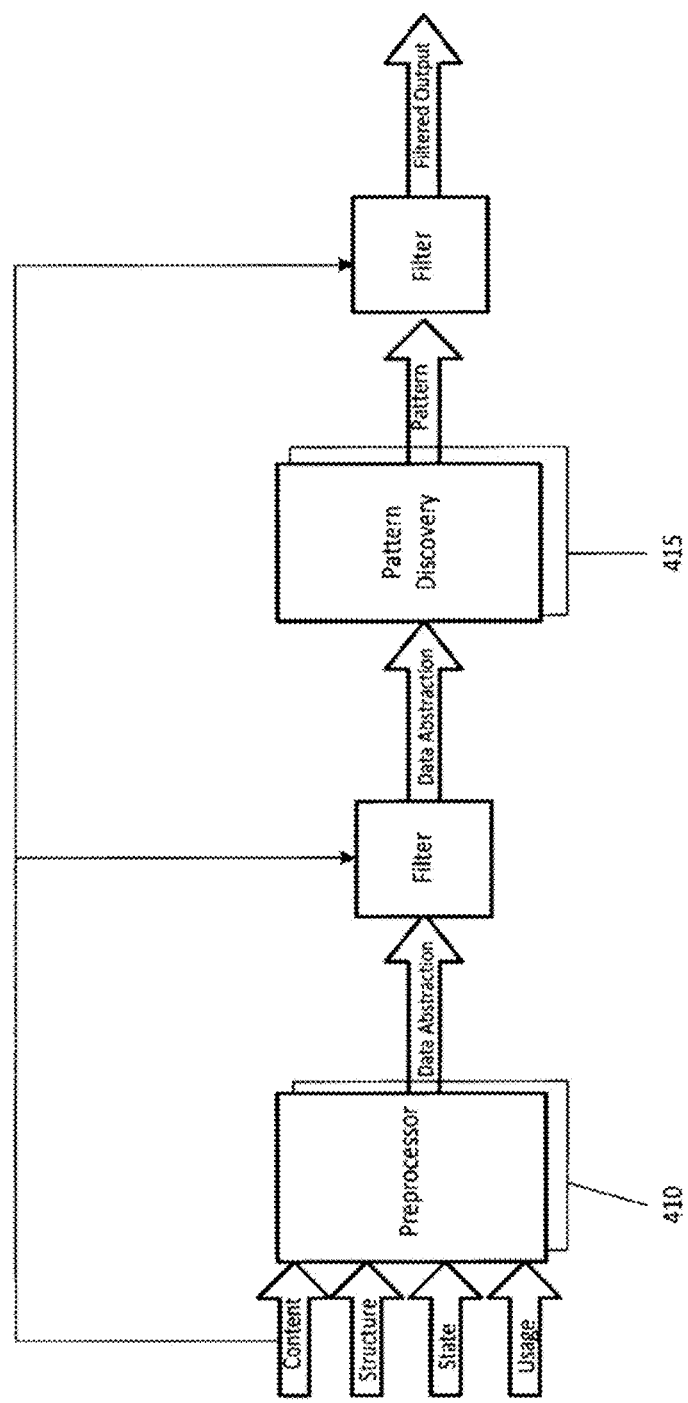
FIG. 13 illustrates the filter application applied to a preprocessor.

UCC-E 220 uses a data processor for preprocessing, pattern discovery and pattern analysis. As shown in FIG. 12, in order to discover patterns, the data retrieved needs to be processed. Preprocessor 410 converts the content, structure, state and usage information into a data abstraction that is used for pattern discovery 415.

Tracked activity for the UCC-E can include the time, the location (home, office, Wi-Fi spot, etc.), the type of user devices used, the network connectivity type (Wi-Fi, Bluetooth, Cellular, etc.), the activities and duration (TV, Internet, Video, content sharing, etc.), and the context, which includes TV content, such as TV channels, PPV, VOD, program category, or Internet, such as website visited and keyword monitoring. Gateway 150 can detect if a TV user device is on or off and can distinguish multiple users using the same device, for example if several users are watching different portions of a split TV screen.

Usage preprocessing is used to distinguish user sessions from server sessions. Therefore first the user is distinguished from: another user that uses the same device; the same user that is using a different browser; and the same user that is using a different device and network.

The next step is then to identify the user's usage by obtaining a request that was generated from the user, or automatically generated, as a link within a page. Table 1 is an example of such usage.

TABLE 1

| Rec # | Dev_IP | Time | Device Type | Net Type | method/URL/Protocol | Status | Size (e) | Action by | Server IP | Browser Type |
|---|---|---|---|---|---|---|---|---|---|---|
| 1 | 127.0.1.26 | [dd/mm/YY: T:M:S:ms] | MotoQ M230 | 3G | "GET A.html HTTP/10" | 200 | 4000 | * | 239.150.24.67 | Java/3/2(Moto I) |
| 2 | 127.0.1.26 | [dd/mm/YY: T:M:S:ms] | MotoQ M230 | 3G | "GET B.html HTTP/10" | 200 | 3050 | A.html | 239.0.24.67 | Java/3/2(Moto I) |
| 3 | 127.0.1.26 | [dd/mm/YY: T:M:S:ms] | MotoQ M230 | 3G | "GET C.html HTTP/10" | 200 | 5020 | A.html | 239.1.24.66 | Java/3/2(Moto I) |
| 4 | 127.0.1.26 | [dd/mm/YY: T:M:S:ms] | MotoQ M230 | 3G | "GET D.html HTTP/10" | 200 | 3080 | * | 239.150.24.67 | Java/3/2(Moto I) |

Content preprocessing classifies the content to different categories. The result of the content classifications is used to filter the input or the output to the pattern discovery 415. The page view could also be used to filter the sessions before or after pattern discovery. As an example once a pattern is discovered, then the classified material of the page view could be used to focus the result to a certain subject or class of product. FIG. 12 illustrates the filter application applied to preprocessor 410.

The preprocessor 410 thus classifies page views. The page views could be classified based on topics and/or intended use, such as blogs, news, social networking, academia, corporate, personal, shopping, non-profit and others. Page views convey this information through text, graphic, and multimedia. The information on the page views must first be converted into a quantifiable format. Some version of a vector space model could be utilized to accomplish this. Keywords or text descriptions can be substituted for graphics or multimedia.

For the static page views, HTML/XML is parsed and reformatted based on an algorithm to break page content to categories suitable for preprocessing. When breaking down dynamic page views, first the dynamic sections are distinguished from the static sections. If the page is highly dynamic then it is broken down into sections based on the state of dynamic sections, e.g. a section could by highly dynamic while another one is semi-dynamic. An example of such content is when viewing a news description page the reading pane is static while the area around it is dynamically changing. Within the dynamic section some sections are highly dynamic and are automatically changing frequently while some sections are changing only if the page is refreshed by the reader. In fact these sections changing on refresh are the sections that are relying on user characteristics in order to push the personalized information. A given set of server sessions may only access a fraction of the page views possible for a large dynamic site. Also the content may be revised on a regular basis. The content of each page view to be preprocessed should be assembled, either by an HTTP request from a crawler, or a combination of template, script, and database access. If only the portions of page views that are accessed are preprocessed, the output of any classification or clustering algorithms may be skewed.

The structure of a site is created by the hypertext links between page views. The structure of a site and its preprocessing could follow the same model as content preprocessing described above. Once again there should be a different model on dynamic and static pages.

There are main parts in pattern discovery. The first part is based on the algorithms and methods used for the discovery. These algorithms could be based on a single or a combination of statistical analytics, pattern recognition, data mining, and machine learning.

Statistical techniques are used to gather information about the user visiting a site. This includes the frequency at which the user visits the site, the mean value for the time the user spends on the site, the average length of navigation path (from where user follow the content linked from one to another page) and others. These tools include statistical information such as the most frequently accessed pages, average view time of a page or average length of a path through other links or identifying invalid URLs.

Association rule generation can be used to relate pages that are most often referenced together in a single server session. For example, if a user first visits a sporting equipment site and later visits an electronic equipment site then the association rule may reveal that the user should be interested in electronic sporting equipment.

Relation of the pages that user browses may reveal the user's interest in content which assist in clustering and associating and grouping the content based on user interest. Based on this information, dynamic links could be created to request on behalf of the user, content based on the user interest.

As discussed previously, once the content is discovered and classified in different categories, the result can be used to categorize the user. The classifier module will learn over time how to classify the user using AI algorithms such as decision tree classifiers, naive Bayesian classifiers, k-nearest neighbor classifiers, Support Vector Machine or others.

The last step is Pattern analysis, which filters the irrelevant rules or patterns that was discovered through the discovery phase by using the raw content as above figure shows. The filters and rules could also be through configuration parameters or rule and/or policy engine. The most common form of pattern analysis consists of a knowledge query mechanism such as SQL. Another method is to load usage data into a data cube in order to perform OLAP operations. The content and structure information can be used to filter out patterns containing pages of a certain usage type, content type, or pages that match a certain hyperlink structure.

Gateway Features

Gateway 150 has the capability of receiving TV from IP, Cable and Satellite and is integrated with DSL modem capabilities, Wi-Fi and optional wireless 3G network connectivity. The integration of TV, DSL and Wi-Fi reduces the customer premise installation time and prevents the need for multiple trips to the customer premise for different installations.

The middleware of gateway 150 is based on a component software architecture that provides a series of gateway functionalities, additional to standard STB and Modem features, and allows gateway 150 to function as an ASG (Application Serving Gateway). With this solution, users of gateway 150 become subscribers of the ASG. User devices 180; such as TVs, mobile phones, laptops and PCs will all be registered to the ASG through an online portal during the gateway 150 activation process in a very simple process. To the end user, gateway 150 appears as an integrated Set Top Box that reduces their need for extra equipment and wiring requirements while delivering additional features and benefits that are part of the service differentiation offerings.

The system does not require installation of a client application on any of the user devices 180 (although in an alternative embodiment it may use such a client application). All traffic is handled by Gateway 150 through an AI (Artificial Intelligent) engine that can distinguish and manage each user's traffic, under varying connectivity situations (device, network type, location, etc.). The approach distributes the CPU and memory requirements for millions of users out to the subscribers' premises, similar to a subnet, enabling faster and more accurate data processing.

Gateway 150 is able to receive live TV broadcast from (cable and IPTV) service provider including free channels and encrypted channels based on subscriber package. Gateway 150 understands the encryption algorithm used by service providers for such encrypted channels. Gateway 150 can also support PPV/VOD services from the service provider and can follow the subscription package to support the services and can differentiate PPV/VOD from a regular TV broadcast.

Gateway 150 can provide TV streaming to other user devices e.g. laptops, mobile phones. Gateway 150 is able to stream a live received TV feed per channel based on permission level to other users. Gateway 150 can transcode TV streams differently and automatically based on the user device receiving the stream, taking into account the user devices' physical and performance constraints such as screen size, CPU, memory size, and supported audio/video codecs. Gateway 150 has a transrating dynamic speed control to suit the network bandwidth during streaming.

Gateway 150 allows user watching a TV stream to resume playing from a previous stop point while streaming to user devices. A user can thus pause, play and go in reverse for a live TV stream. For mobile phones and similar user devices, a hot key can be implemented.

Users can view live TV program and recorded TV/video contents on a TV display simultaneously. Gateway 150 supports pause, replay, rewind, and fast-forward functions for both live TV programs and recorded TV/Video content while watching on TV or on PC or mobile or handheld user device.

A user can play recorded content on a user device while available tuners are allocated for recording. Gateway 150 should have a buffer, for example a 60 minute buffer for time shifting (recording and playback) a TV program. This buffer should always contain the past 60 minutes of live TV content being watched. This buffer can be emptied when gateway 150 is turned off.

A user can also switch from a watched program from live TV (with time shifting buffering in progress), to a recorded TV or video content while the time shifting buffering continues, or to programs being recorded.

For TV streams using PPV and VOD services, the availability of the content is subject on the subscriber package. For example, if a user has purchased a VOD, the user may be allowed to watch the stream on any of his/her user devices for a period of 24 hrs, or perhaps just on a single device at a time. The user may also be able to watch a portion of the content on a first user device and another portion on another user device. If this is the case, Gateway 150 must follow the user's device and track the used content and the content usage policy and subscription. Therefore gateway 150 is able to inspect the content and differentiate PPV/VOD streams from regular TV streams, allow conditional access and obtain information about the subscriber package from the service provider.

A users' service subscription is resident on servers controlled and managed by the service provider, Gateway 150 can communicate with such servers and obtain information about the user's subscription to determine the services for Gateway 150 users.

Users can also use gateway 150 to watch TV streams wherever they are located with a registered user device, including PPV and VOD TV streams. Thus the local receiver capacity (number of TV tuners) is no longer the limitation in receiving live TV contents. Gateway 150 is required to share the live TV/PPV/VOD contents with Gateway 150 users and the process is managed by service provider. A user may be able to watch TV/PPV/VOD contents through other Gateway 150s in any geographic location. For example, assume User A only two TV tuners in his Gateway 150. Both tuners are already engaged in recording activities and user A would like to watch a live hockey game on channel X. User A subscribes this live hockey game program thru a PPV service. Service provider will search all Gateway 150 users and locate the closest Gateway 150 user who is watching the live hockey game on channel X, User B. The service provider will have user B's Gateway 150 share the content with user A's Gateway 150. In the case where user B switches to different channel, the service provider will locate another Gateway 150 to share contents with user A.

If gateway 150 has two tuners (gateway 150 may have more than two), then users could record TV programs through local TV tuners, and record a maximum of 2 TV programs including live TV/PPV/VOD at the same time while watching only one of the two programs in a given time. The users could play recorded content while both tuners are allocated to record by using Recording and Playback at the same time. Users could record one program and navigate through any other in-progress TV program. They could switch a watched program from live TV, to pre-recorded programs or to the programs being recorded.

The user has two ways to start recording a TV stream, "Quick" or "Programmed". For the Quick method, on any in progress content, the user presses Remote Control's Record Button or on any listed content in the EPG, the user highlights the program and presses the Remote Control's Record Button. Gateway 150 then starts recording the stream or for a future program sets the program in schedule to be recorded. When programming gateway 150 to record, the user selects record from an onscreen menu, and then follows the onscreen instructions including the option of selecting a program from the EPG. Recording options include time, extended time, auto deletion setting (per recording), user restriction for viewing, format/codec for saving recording, and whether it is a recurring recording.

The user is able cancel a recording before the recording start or during recording. In the case of a schedule conflict of recording, priority will be given to user with higher priority set by admin, and for users with the same priority setting; the first to set the recording has priority. Gateway 150 has an LED or message to indicate a show recording start or in progress. A warning will be provided if a user would like to switch channels during recording when both tuners are engaged. In this case, the recording should be stopped first before the channel switch is permitted. Gateway 150 maintains a personal library of recorded programming, accessed through content grid guide. Users can access right protection on recorded content, e.g. user A can normally view/play user B's recorded contents unless User B restricts it. Users can also record programs using a gateway 150 to which they are not registered. The service provider can have a second gateway 150 record a TV stream and send it to the first gateway 150.

Gateway 150 allows the recording of digital content from sources such as digital camcorders to be saved in original HD or standard formats on its hard drive. These viewing interfaces will be called from each user account. The recording and viewing of such files can be started and stopped at any time based on availability of Gateway 150 resources.

The user interface could be a direct interface with gateway 150 or use an Internet browser. In the case of a direct interface, the user can connect a digital camcorder to gateway 150, an interface appears indicating that a device is connected to the gateway 150, the user navigates through and sets parameters and starts recording and gateway 150 software automatically converts the content to a format suitable for replay on gateway 150 if needed. If using an Internet Browser, the user calls the gateway 150 interface and navigates to an "Other Recording" feature, an interface opens asking to connect the camcorder, the user connects the digital camcorder, PC, or Laptop and selects to start recording on interface, and the gateway 150 starts transcoding and transferring the content. Users should be prompted if hard drive is becoming full.

Gateway 150 can perform video playback, and can play recorded content at the same time both tuners are allocated to record other streams. Any user can replay saved video contents, subject to permissions regarding the content. The playback can be started and stopped at any time.

The video playback option allows users to access a saved contents list; browse the list and sort the list based on: original recording time; category of content; time of recording and channel. The user can replay from the last second watched or replay partially watched saved video contents from the moment stopped.

The replay can be tagged at certain points by a user. The replay can be started directly from such tagged points. The user can access the saved tagged points, browse the points and preview screenshots. Gateway 150 also allows volume balance for each channel. The sound volume may be automatically adjusted based on pre-set specifications which may be based on the particular user separately. Gateway 150 can detect the audio quality and adjust the volume accordingly.

Gateway 150 also allows video streaming to user devices other than a TV, such as laptops, pads and smartphones. The user of the user device must have permission to view the content. The video stream may need to be transcoded by gateway 150, in a manner invisible to the user, based on the user device, taking into account the user devices' physical and performance constraints, such as screen size, CPU, memory size, and supported audio/video codecs. Gateway 150 transrates the content using a dynamic speed control to suit the network bandwidth during streaming. The user is able to resume playing from a previous stop point.

Gateway 150 saves the data of a TV stream in a cache in its original HD or standard format on hard drive. It can be accessed by a user at any time. The user can tag any point of the stream for future reference. The tagged point will automatically be saved and given a name, and a user may later modify the tags name, start and end point.

Gateway 150 includes multiple interfaces that allow saving digital contents from auxiliary user devices, such as digital camera or iPod (image or MP3 files) in a specific format suitable for replay on gateway 150. These interfaces will be called from each user account. They can be started and stopped at any time based on availability of gateway 150 resources. They allow users to record content and saving it on the gateway 150 hard drive, create a slideshow or playlist and manage images. Users may also delete saved content from the gateway 150 hard drive dependent on their permission to access the content.

Video playback on gateway 150 can be controlled using a TV remote, including adjustments for channel and volume. Gateway 150 will also be provided with a remote control.

Gateway 150 will provide users with a "content grid guide" which is an interface for previewing a TV guide (through the EPG) and the stored content, such as music, video files, and recordings on gateway 150. The content grid guide will serve as a TV preview using the EPG provided by the service provider. It may have various display modes including full screen, quarter, double, and a miniaturized version, such as a strip at the bottom of the screen. It may be accessed by different user devices including, computers, TVs, smart phones and pads. The user may scroll through in a variety of ways, including a fast scroll option (e.g. by day or page). The user may change preferences, such as color and font, and permissions using parental control features.

The content grid guide allows users to sort channels by certain criteria, such as channel number, program category and time. Users can access record and search (by name or category) functions. Users can also access information about a program (or for any file or content being played). Such information may be available from the EPG, and may also include recording status, remainder (time left in program or file), the rating and an image representing the content.

Gateway 150 may also be used to exert parental control over the ability of children to watch certain content, or to limit the time that they may view certain user devices (for example TV viewing hours may be limited from 7 pm to 9 pm), or the maximum amount of use per day. Users access a parental control interface and can select permissions based on parameters such as ratings, channels, programs or combinations of these. Likewise, controls can be established based on time per week or certain time periods. The parameters can also be based on particular user devices.

Gateway 150 is able to connect to the Internet through Ethernet or Wi-Fi. User devices can connect to the Internet through Gateway 150 via Wi-Fi. Gateway 150 thus functions as a web server to provide content (such as streaming videos).

Gateway 150 also allows files to be transferred between registered user devices. Gateway 150 can receive a file through the Internet, a user device, or another source, such as a USB device. Once on gateway 150, the content can be transferred, used to create a playlist, modified and organized.

Gateway 150 can auto detect devices connected to it, and allow the user to set parameters such as user account, location and content management parameters. Alternatively, the user can select to import files, and respond to prompts regarding connecting the device, and setting the parameters. Gateway 150 allows user to access saved content through user devices or directly through gateway 150 interface.

Gateway 150 can also be used for VoIP, either directly or through a user device. One use of gateway 150 is to allow VoIP to be used though a user device such as a smart phone, through the Internet access via gateway 150 or a PC.

Mobile devices can connect to gateway 150 when they are distant by using a web interface. Gateway 150 provides the appropriate transcoding and transrating.

Gateway 150 provides several basic services. For example, gateway 150 is configured to assist users through activation. Activation may proceed through a web interface, and should follow the service provider's activation flow. Customer service representatives from service provider may have an admin ability to overwrite configurations completed by users. Each gateway 150 may have an associated "family" account with all administrative privileges.

Each user should create their own account (which may or may not be password protected) using the "family" account. The service provider may set a limit on the number of accounts. Each user account may be given different privileges, for example whether the account has admin privileges, password change rights, name change rights, or theme change rights. Each user may have their own profile, e.g. color, desktop, theme, font, font size. Typically, only an admin account will be able to do device registration. The "family" account can also be used to reset passwords, such as forgotten passwords, possibly including the "family" account password. Restrictions can be placed on accounts using the parental control options.

User devices 180 are also registered with gateway 150. Multiple user devices 180 may be assigned to a user account, and likewise, multiple user accounts may be associated with the same user device 180. Gateway 150 provides an interface to allow a user to connect a user device 180 based on the capabilities and parameters of the device. The service provider may wish to limit the type or number of user devices 180 that can connect to gateway 150. If a device 180 is connecting to gateway 150 via a 3G network, gateway 150 is able to identify the device through the device's EG cookie.

Gateway 150 should authenticate and authorize users and their user devices 180 when connecting to gateway 150. The user's service subscription must be used to determine the privileges of the user. The gateway 150 thus uses the user account and password, the user device 180, and the user's subscription.

Gateway 150 performs a TV and video content transcoding role. The transcoding is done automatically, taking into account the content, the user device 180, the bit rate and location of the user device 180, and other constraints such as memory available, processing power, screen size and audio and video codec available. The bit rate and transrating shape the video stream. Transcoding occurs whenever video content is shared or transmitted to user devices 180 via the Ethernet or Bluetooth ports. Gateway 150 includes a user interface whereby a user can transcode and save content in different formats; making the content cross-device transferable. This interface will be called from each user account and can be started and stopped at any time based on availability of Gateway 150 resources. Once converted the content can be saved on a user device 180 storage or on Gateway 150's hard drive. The interface generates a list of compatible registered user devices 180 based on the content format selected.

Gateway 150 can thus reformat content, such as that found on the Internet, for different smart phones. Gateway 150 does this by inspecting the content, downloading it, and if necessary for the user device, converting it to a different format. In an embodiment of gateway 150, when a user downloads content, for example, a video, that the user device cannot play, the user is prompted with a note the video is unplayable on that device, and asking the user if they would like to convert. Alternatively, any content reformatting could be done seamlessly, invisible to the user.

Gateway 150 can display Internet content on a TV display and TV content on an Internet display, like a smart phone or laptop screen. In doing so, gateway 150 receives the content, transcodes it into the most suitable format for the receiving display. In such a manner, gateway 150 can provide a split screen TV display including both TV video and other content. The other content can include widgets, advertising, a menu, a keyboard, a game or Internet browsing. A video call, audio call, or text chat interface may be included. Gateway 150 should support popular chat functions, such as MSN, Google Talk and Skype Chat. The display options may be limited and determined by the service provider, or by the user. Gateway 150 provides an interface whereby a user may split the TV display screen, for example by half, quarters (with each quarter displaying different content), or other combinations.

A user can use the user device 180 displaying the TV content, for example a laptop, iPad or smartphone, to control the TV, for example change channels, pause the program, etc.

Gateway 150 may be configured to have interfaces with popular social networking or file sharing sites, such as Facebook and LinkedIn. Transcoding may be used to make these sites usable on user devices such as TV displays. User particulars, such as user names and passwords may be stored on Gateway 150.

Gateway 150 should be able to assist content provider in digital rights management. In an embodiment of the invention in which client software is on the user device 180, the user device 180, such as a smart phone can, for example, remove content as it is played in the case of PVRed or VOD content. The policy of DRM is an additional layer over the top of all engines which decides on the sharing mechanism of digitally protected content.

Gateway 150 should offer several security features for box access, communication of content amongst users, user access to data, intrusion detection, authenticating users and user devices and encryption/decryption of video streams.

Gateway 150 includes a graphical user interface (GUI) to interact with users and perform certain functions. Users may use the GUI to record TV content. The GUI allows scheduling future recording of TV content as single program or a TV series. It can be set by any user can be called at any time. A user may use the GUI to access a TV listing, and modify record settings such as start time, stop time, new or repeating episodes on different channels, time of broadcasting, and deletion conditions.

The GUI can be used to review the scheduled recording list. Users can access the schedule and make modifications. The list can be sorted based on user, date and time, category of program and channel. The GUI can also be used to access and input items into a calendar with a reminder system (which may be sync to calendar systems on user's smart phones or PCs). Users can use the GUI to review the scheduled reminder list, access the schedule, and modify, browse and sort the schedule based on user, date and time, category and channel.

The GUI can also be used to search content stored on Gateway 150 or user devices. Such a search can be done using different filters. An on screen keyboard may be used for this purpose. The results of the search may be sorted by user, type of content, category of content, channel, recorded or future status, PPV or source. Trailers or previews of the content may also be provided.

Each user may have certain favourite channels associated, which can be based on particular channels or categories of channels. This can be sued to assign characteristics to the user. The channels may be sorted by user, type of content, category, channel, PPV status, on demand or downloadable status.

Remote Management

Gateway 150 may be managed remotely by the service provider. Such management may include monitoring and diagnostic functions, trouble management, performance management, and configuration and customer support.

The remote monitoring and diagnostics module is responsible for monitoring the health of gateway 150. It includes low level debugging tools that monitor errors and warnings reported by the various modules and the resource usage of each module according to its upper bound limit as set by configuration. The module operates in active mode, in which it automatically reports on errors; or a request/response mode, in which it responds to command generated by a remote technical support team. The request/response could be a request for gateway 150 to run a test script. The configuration file for this module could be updated remotely, as could the module and its parameters.

The remote trouble management module can provide full control of gateway 150 to the service provider's technical support team. The module enables technical support to control all levels, allowing the support team to run procedures, look up registries, communicate directly with any hardware and software components, measure throughput, signal quality, etc., check the communication between hardware components and software, isolate the cause of problems, apply updates and software patches, and enable or disable components.

The remote performance management module tests the performance of the connectivity to gateway 150 and within gateway 150, which includes timing: per transport layer protocol; per application layer protocol; per transaction; per session and per number of concurrent sessions and transactions. The module also tests packet loss, throughput, error rate and delay, and connectivity to user devices registered to Gateway 150.

The remote customer support module provides high level customer support, including allowing users to contact customer support. It may include demos and some remote management functions, such as activation, authorization, setup, configuration, and software updates.

Gateway 150 can support multiplexing streaming video to add layers and images to video content. For example gateway 150 can add logos to TV content. Gateway 150 also supports closed captioning, including the language, font size, and colours used with captions.

Application Manager

Gateway 150 has an application manager to manage the state transition among the applications operating within gateway 150. The application manager processes a user's request and delivers the request quickly to a desired application service or module. The application manager receives user request from a native key event manager, and dispatches the request to application services. The application manager resides between application modules and middleware inside Gateway 150 system.

The application manager, when the power is on, leads the system into a "main" service in the factory setting mode of gateway 150. The main service waits the user's choice, and notifies the application manager to launch the selected application service. The application manager, when the power begins as "off", leads the system to enter the previous application service which is "remembered" in the last power off state. The application manager, when the power is turned "off", notifies the application service shut down and brings the time update automatically in front panel.

Architecture

A representative architecture for gateway 150 is now described. Gateway 150, as previously described includes hardware, middleware and services. The software in gateway 150 is based on modules and engines characterized by their main functionalities, and therefore the modules in each group or category have the same basic functionalities and can be distinguished from each other by specific functions. Modules are grouped into the following categories:

Essentials: The main container will not be loaded without the essential modules.

Actors: The service engines that need to be running and providing an automatic series of functionalities.

Reactors: The modules that act according to reflexes (invoked and/or behave differently as per request and types of others).

An important aspect of the design is that all modules support protocol communication interface through a message structure. This isolates the dependency of the modules from each other to the extent that each module could even be developed in a different language and each module is a sub system of a larger system. The output of one module could be the input of another module and the output of the system is the result of the collaborations among all modules.

The Main Container is a small module that reads a configuration file and then, based on the information presented in the file, loads the modules. The path to the configuration file is an input parameter to the main container. The path could be an address to a file and/or a database which has either resides locally on gateway 150 and/or remotely within a data centre. Therefore the Main Container must have the communication capability of connecting to a database or file, and receive command lines as input for mandatory functionalities and as well as the ability to read a path for loading modules.

Actors are the modules that actively and automatically act on a task. Actors will load and run in the background at all the time. For example, a watcher is an actor the loads at runtime and is invoked periodically to check the status and health of the system. Actors have the same behavior without any dependency in change of state. For example, a deep content inspection module is always scanning the content of a stream no matter what type of network, device or content is involved.

Reactors are the modules that change their behaviour based on the state change. Reactors can be considered as intelligent modules where the module learns through the time and behaves differently based on the state. For example, the Personalization Engine (PE) module could be considered as a Reactor. The PE Module learns from the user's behavior under different conditions and based on the collected knowledge, provides the service differently i.e. looking for different content to present and push to the user based on knowing the network, device, and state the user is. The collection of the affirmative information forms a state that causes the PE Module to move or behave differently and produce a different result. The video rate shaping module is another example of such a reactor, wherein summation of users' state information, including type of device, connectivity type and quality, state in terms of mobile or stationary, at home or distant location, and type of content and the viewing capabilities under the state condition, would result in a rate shaping algorithm which could be completely different under different conditions (for example when only one parameter is different). The design of reactors is based on separation of logical layer from data layer.

Actor or Reactor defines the main framework of each module, whether the framework is an algorithm that changes based on input event and parameters, or is a static framework. The modules also differ on basic functionalities for each module of the defined type. Therefore, the modules can be further grouped into the following categories:

1. Content Inspectors, including all client portals: the entry point of the client user device, such as game consoles, OS-based mobile devices, non OS mobile devices, laptops, TVs, remote controls. This also includes deep content inspection modules for both textual content and non-textual content (graphic and video).

2. Content Consumers: are the modules that process and analyze the content/data collected and consume it for other purpose and tasks. These include the characterization module which receives the data collected from the inspectors and analyzes it in order to characterize the user. Note that this module is of Reactor framework type. It also includes the personalization module wherein different menu options will be loaded based on user preference, context (state) and the output from characterization module. This module could also be the module that draws the page on the display based on user characterization output. For example while one user may like to have the screen layout and information organization different from one user to another, or even from one user's device (e.g. Mobile) to another (e.g. laptop). All storage, backup modules are also consumers; they are also of type Reactors, e.g. based on type of content, and user's status where to backup and how often to backup vary from one condition to another.

3. Content Producers: are the modules that produce the content for the user. These include the intelligent search engine which searches for content on behalf of the user based on the output of characterization module. Note that this module is of type Actor since its behavior/task (searching) doesn't change while the input (type of content to search for) is changing. It also includes the multiplexer which is also a content producer, since it receives, for example, a video (TV stream) and the advertisement and produces a new mixed content. Note that this architecture allow gateway 150 to have a dedicated multiplexer for each content format; e.g. 3GPP or MPEG4, etc. which makes it of type Actor, or alternatively one multiplexer handles all types and changes its algorithm based on the request which makes it of type Reactor.

4. Data Communicators: are modules that are responsible for networking related activities and include determining the fastest/shortest path to available content; the fastest/shortest path to the user device; video rate shaping and others.

Figure 14:
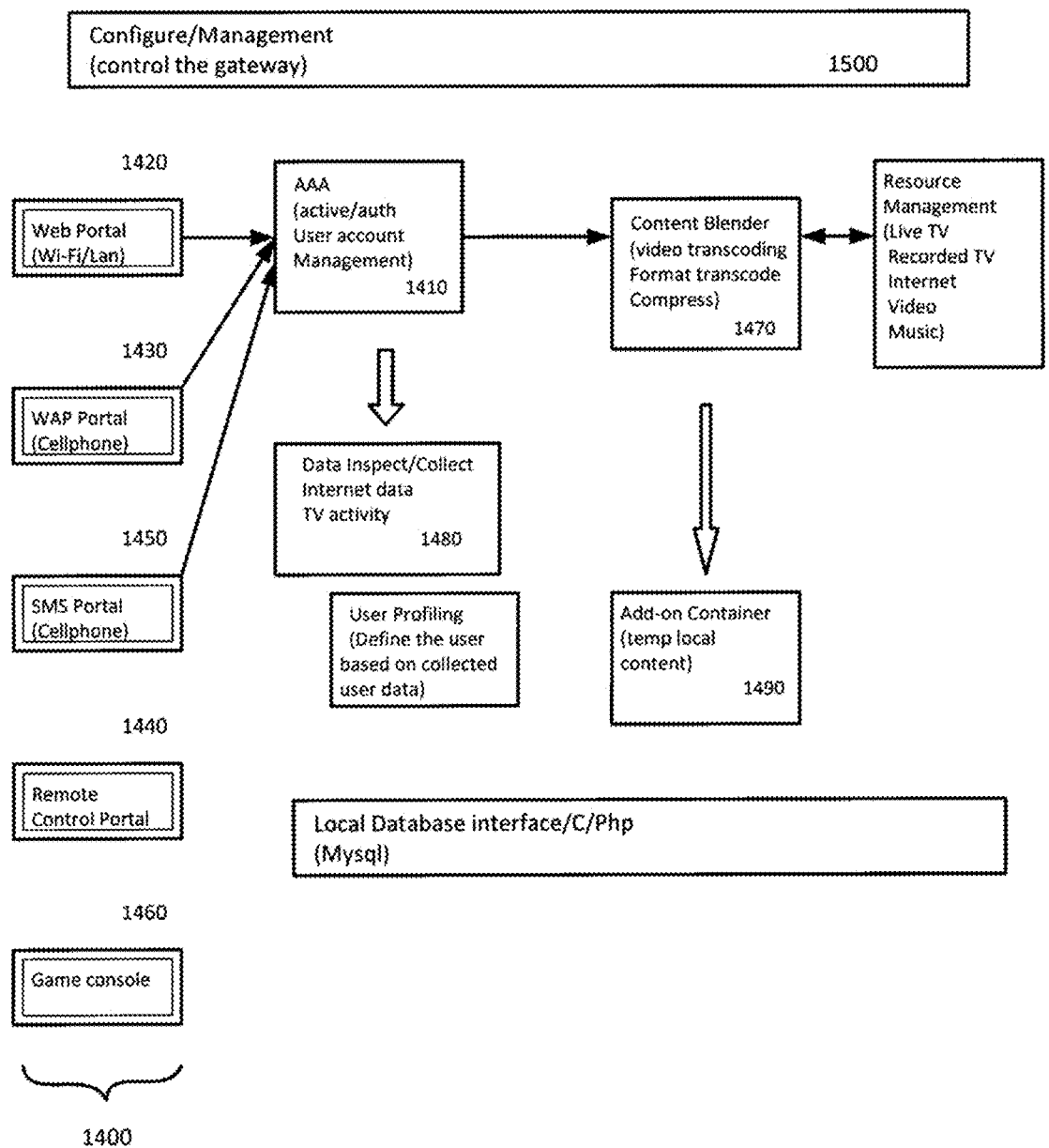
FIG. 14 is a block diagram showing the control manager of an embodiment of the gateway according to the invention.

As shown in FIG. 14, all user devices, when accessing gateway 150, pass through an access portal 1400, which act as a proxy or gateway. These access portals pass the identity of the device (and user if it is shared) to the AAA module 1410, collect user data to send to the data collection module, access the resource through the resource management modules. Examples of these access portals 1400 include the Web Portal 1420, the WAP Portal 1430, the remote control portal 1440, the SMS portal 1450, and the game console portal 1460.

The Remote control portal 1440 has two modes, basic and advanced. The basic mode allows turning on gateway 150 with a remote control and ignores the password notification. A default account is selected for the basic mode for the AAA module 1410. In the advanced mode, the user inputs 2-4 digit number as a password when prompted, allowing the gateway 150 to identify the user. Alternatively, gateway 150 waits until the user selects a certain option, for example favourite channels or web sites, at which point it prompts the user to provide the password.

The Access Control layer includes the AAA modules in charge of user activation, identification and authorization. Each user device needs activation through AAA module 1410 to start to use the gateway 150, and during this process, the AAA module 1410 will record (and update if possible) the configuration of the user device. For shared devices, the module will activate the user account.

After activation, each time a user device or a user account starts using gateway 150 via an access portal 1400, the portal will pass the user device (or user account) to the AAA module 1410 for authorization. The AAA module 1410 will identify each user device and user, and through a content filter system, search the local content container for suitable content, and pass it to content blender 1470.

Thus the access control layer 1400 is responsible for: keeping all user profiles and box defaults and updated data centrally; communicating with the data center database to get, update, backup, and restore user device data; providing authentication interface for the Portal layer; providing user profile interface for other modules; and providing an interface for User UI for any parameter that can be updated by the user, such as parental control; providing interface to Configuration and Manage net program; and providing interface to data center to activate gateway 150.

The Data Inspection/Collection modules 1480 act as the interface between data collection points (the portals 1400 and the AAA modules 1410) and Data storage (files and local database).

The content blender module 1470 has two major functions, to blend the video content for TV streams, recorded TV and other resources, and to transcode Internet content (typically web pages) for adapting to user device screen size and webpage reformatting to add more content.

An example of the work flow process from a user device connecting to the Internet via gateway 150 and is communication with gateway 150 via a Wi-Fi or LAN interface follows. First, the gateway 150 WEP portal 1430 intercepts the Internet request, abstracts the user device's IP/MAC information, and interacts with the AAA module 1410 for authorization. The AAA modules 1410 passes the user device ID (and account ID if available) to the content blender module 1470, and checks if available (matched) content is in local Add-on container 1490.

If the content blender 1470 finds the matched add-on in Add-on container 1490, it links the add-on for later blundering usage when it receives the feedback from interface agents. The data inspection/collection module 1480 starts to collect the user data along with the device ID (and account ID) passed by the AAA module 1470. The content blender module 1470 transcodes the feedback from the resource/request with the add-on together, sends it back to portal module. The data collection module also gathers the information from feedback data.

The SMS portal 1450 may be a set of pre-defined SMS commands, and also uses the AAA module 1410 to authenticate the sender authority, and to decide to allow or deny the commands send from the user device. After a command passes the AAA verification, the control and management module 1500 parses the command and processes it. Depending on the command type, the control/management module 1500 may determine if it will send the feedback/confirm back to SMS sending user device.

Figure 15:
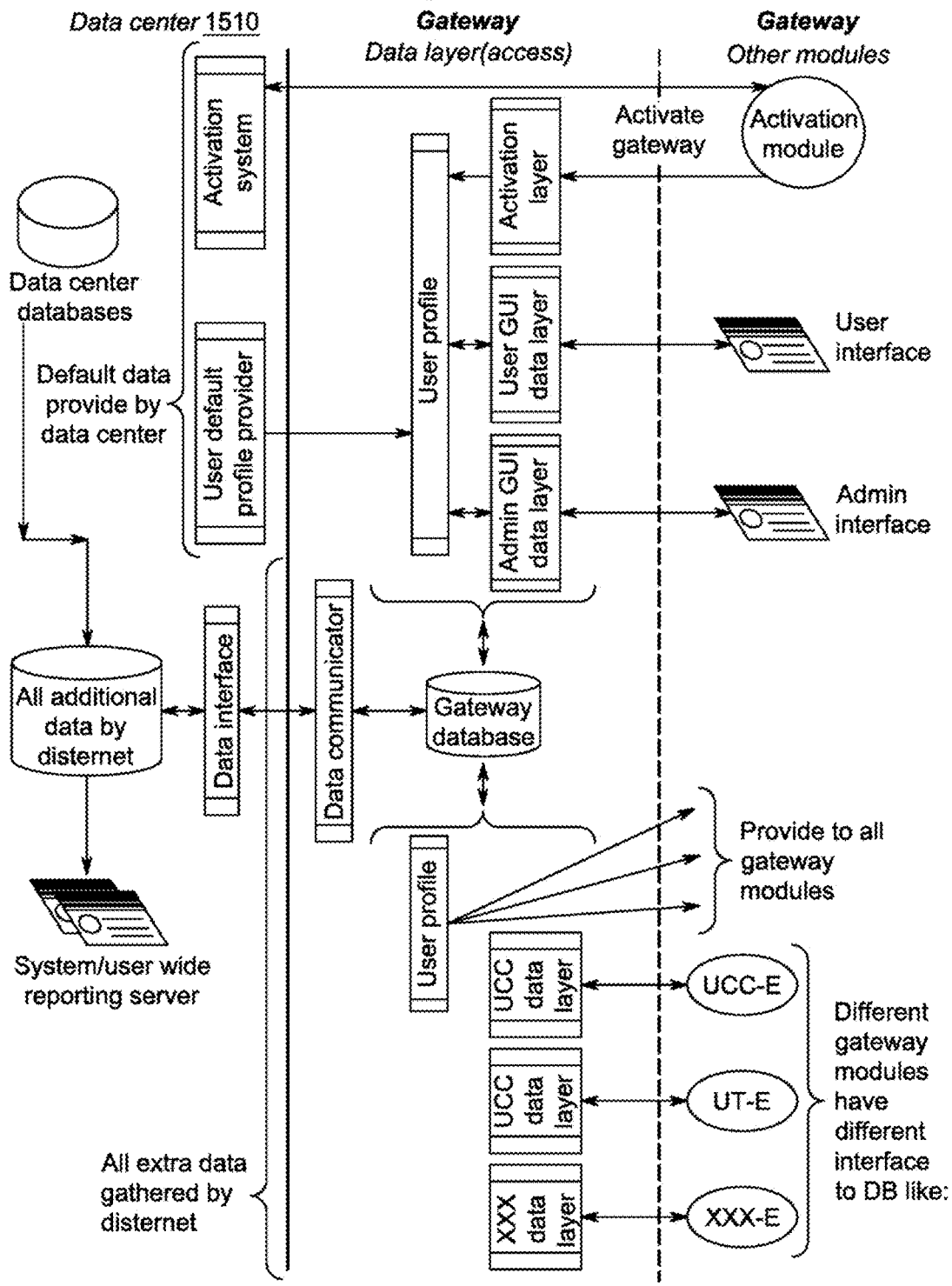
FIG. 15 shows a high level view of the communication within gateway 150 and the service provider data center.

FIG. 15 shows an embodiment of a high level explanation about data communication inside gateway 150 ND between Gateway 150 and the service provider Data Center 1510.
Software Architecture An alternative embodiment of the software architecture for gateway 150 is now disclosed. The Gateway software architecture includes the following components: Application layer; Access control layer; Services Layer; Hardware abstraction layer; Management interfaces; and Database interface.

Figure 16:
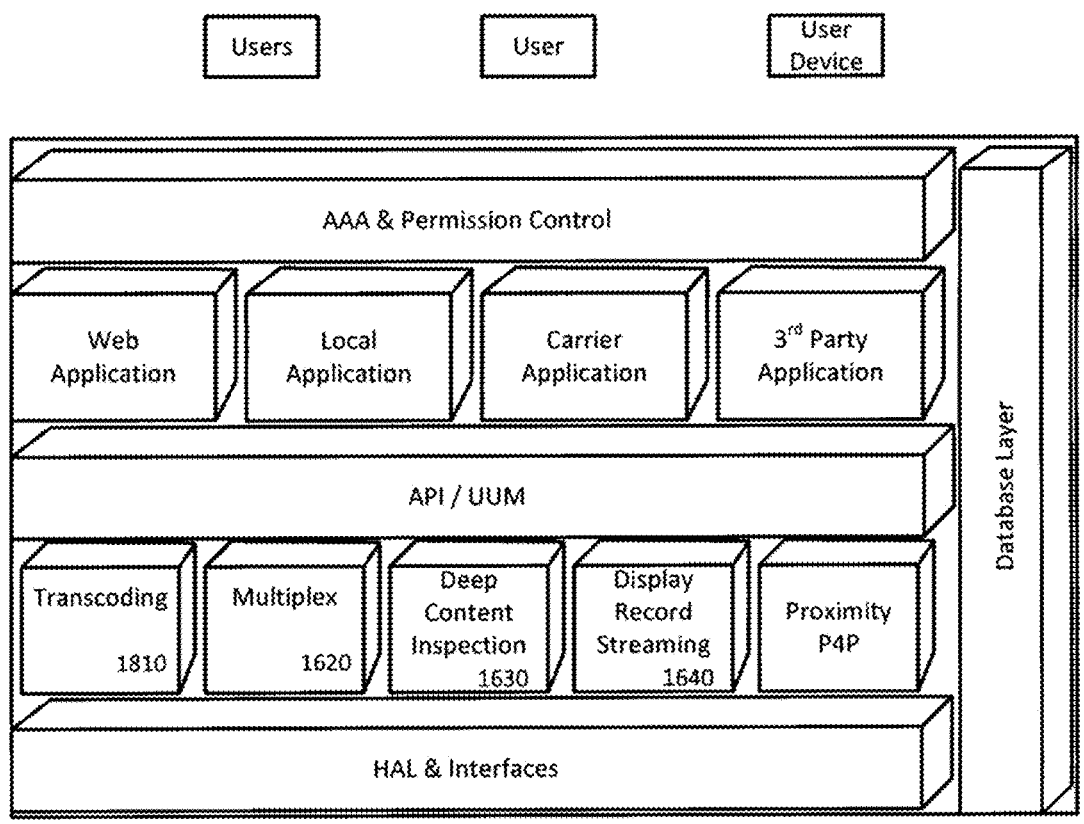
FIG. 16 shows the high-level software architecture of the gateway.

FIG. 16 shows an embodiment of the high-level software architecture of Gateway 150. As shown, function modules of Gateway 150 include transcoding 1610, multiplexing 1620, proximity based content inspection 1630, presentation and streaming modules 1640.

Figure 17:
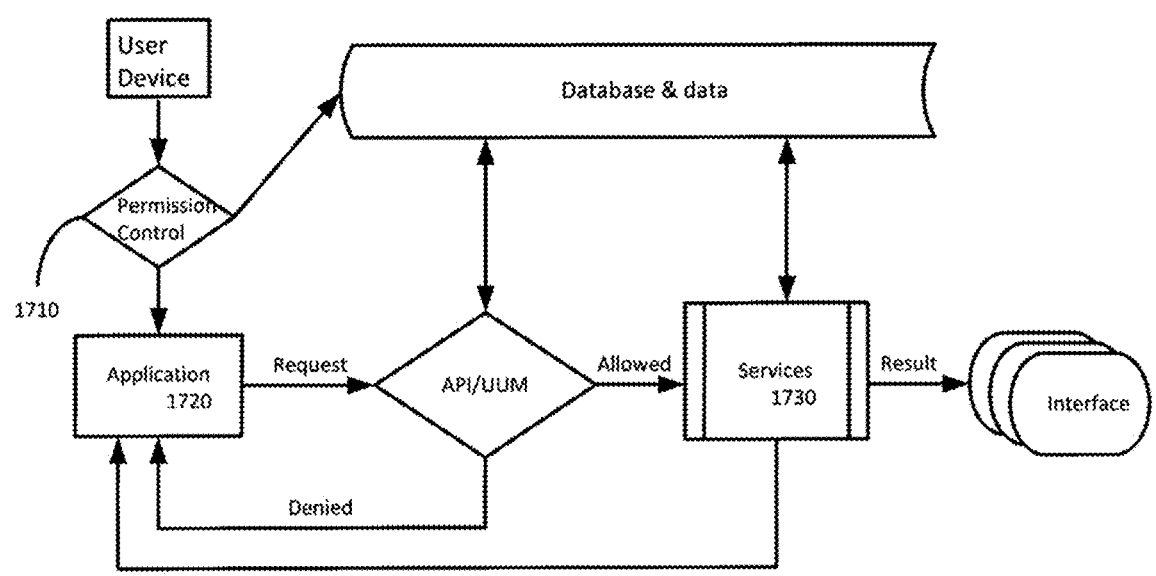
FIG. 17 shows the basic workflow of the Gateway.

An embodiment of the basic workflow of gateway 150 is shown in FIG. 17. As shown, the first step taken is user authentication through permission control 1710, and the following depends on the use cases. The user can call an application to send out a request to certain services, which includes answering "Who I am" (user and device identity), "Where I am" (geographic location) and "What I want" (service information). The access control activates a portal guard and queries the database for account information. If the request is allowed, the request is passed on to the related service. Once the service processes the request, it also logs the activity and the result to the database.

The application layer 1720 includes application catalogued into four different groups (based on the access portal used). The first group are web-based applications, which refer to the Webpages which run on top of the Gateway 150 web server. Any web enabled user device could open these Webpages, and thereby access the Gateway 150. The webpages are of two types; management pages which are used to configure gateway 150 and users thereof; and application webpages with provide web access for functions such as live streaming TV, EPG information, recording programs, and personal content management, such as image and music files.

The second group are local applications, which include management applications, which as described above, can be used to configure gateway 150 or the users thereof, and function applications, such as media players, media guides, and photo albums. The GUI interface with users is dedicated to providing use of such modules.

The third group are carrier applications, which is the group of services, web pages and applications which favour the service provider requirements. Gateway 150's carrier applications provide control and information collection interfaces for the service provider. Control interfaces in this group include gateway 150 activation; gateway 150 configuration; services configuration; and advertisement content pushing. Information collection interfaces in this group include gateway 150 activity reporting; user characterization reporting; and content inspection reporting. These reports include proximity information.

The fourth group is third party applications which are the applications not developed and controlled by the gateway service provider or manufacturer but follow the same interface as above application. These applications could be developed by any third party company or developer following the Gateway 150 SDK. Examples include Skype, and Google Widgets.

The access control layer acts as a portal for all the service requests. This layer defines a service framework and is implemented by two libraries, libdsService and libdsLog. libdsService defines the service framework. The framework implements a skeleton of CLI and the access control interface. libdsLog defines a post instrumentation interface for all the services.

The Service layer 1730 includes all the core services Gateway 150 provides. Each service is a slave of the control manager. In other words, the service can only be accessed by an application and by other services through the control manager using the access control interface. The reason behind this approach is to hide and centralize all the complex service-interaction logic in the control manager.

Figure 18:
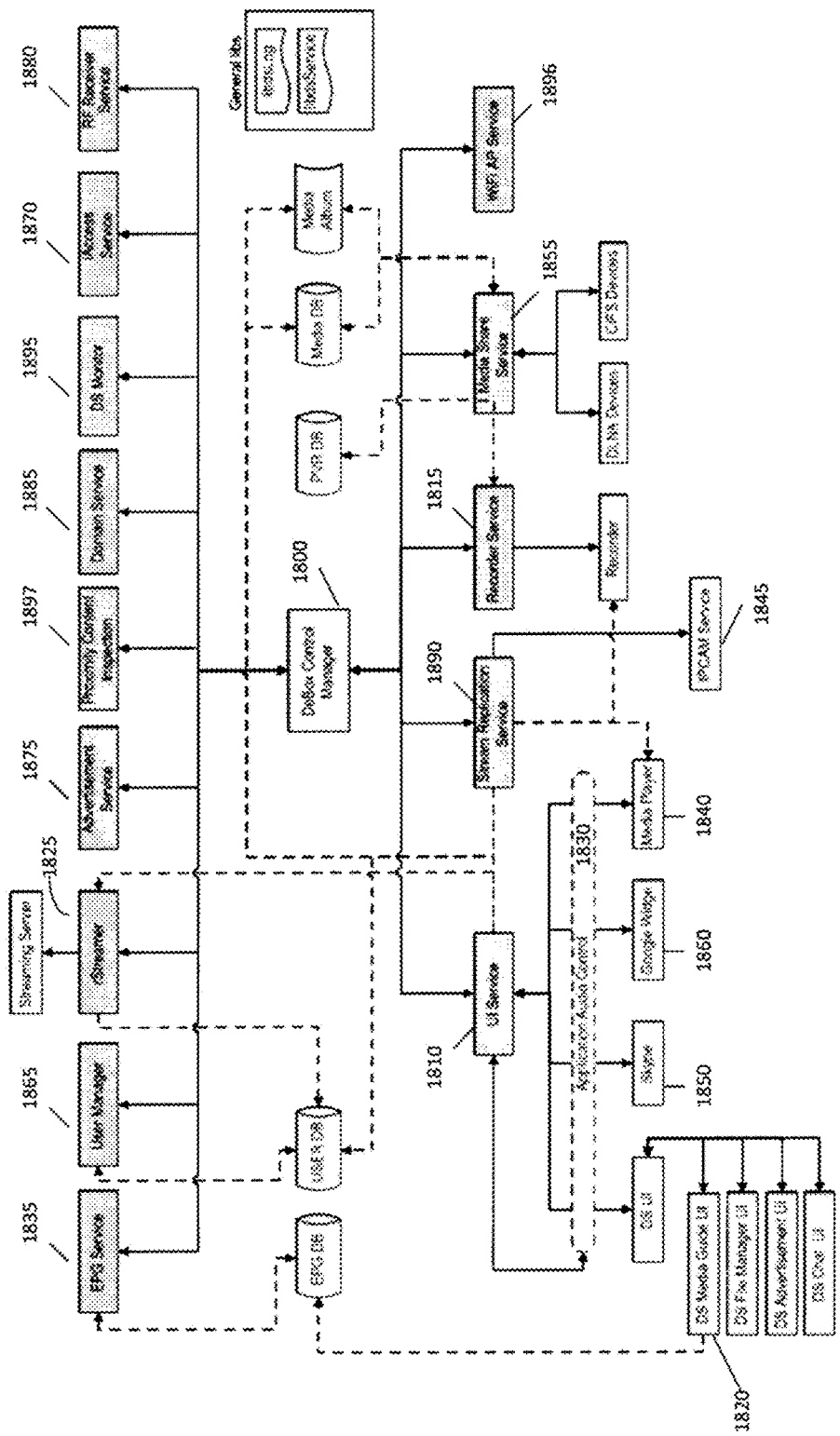
FIG. 18 shows an overview of an embodiment of Gateway services, and the interaction with other applications.

For example, an application could dispatch a request to the control manager to start recording a live TV channel. Behind the scenes, the control manager would communicate with the user manager service to see if the application has the needed permissions, and then setup the recording session with the recording service. As soon as the schedule arrives, the recording service could inform the control manager. The control manager then can inform the replication service to start delivering live streaming to the recording service. FIG. 18 shows an overview of gateway 150 services, and the interaction with other applications.

The gateway 150 Control Manager 1800 exposes a list of important Gateway 150 functions, and delegates to one or more Gateway 150 services to complete a request. It also serializes and prioritizes requests, and provides event subscription mechanisms to other Gateway 150 services. Control manager 1800's duty is to manage complex interactions of services to carry out each gateway 150 function request. Therefore, the Gateway 150 control manager provides the following functions: a facade of Gateway 150 services; serialization and prioritization of requests, and event subscriptions.

The UI Service 1810 acts as the presentation interface of gateway 150. This service contains an application audio control 1830. The application audio control 1830 is a volume mixer that can perform volume control on all the applications used by the UI Service 1810. The UI Service 1810 also interacts and manages layouts with the following major applications: the Media Guide; 1820 the Setup and Activation Manager; the Personal Content Manager; the Photo Album; Recorded Content; the Media Player 1840; Personalized Advertisements; Channel-based Chat; Skype 1850; Google Widgets 1860; and the IP Cam Viewer.

The iAccess service 1870 is a web service that exposes a list of UI features to remote user devices such as iPhone, laptop, etc. This service is similar to a PHP web service. The service features include: serving over HTTP using PHP; converting web requests into equivalent DS messages to invoke action supported by the Gateway 150 control manager 1800; dynamically creating thumbnails for personal images; and automatically providing different layout based on the end-user device.

The RF receiver module 1880 allows a user to use the remote control. To be more specific, this service receives RF signals, then translates the signals into Gateway 150 remote control command, and notifies the control manager 1800. The service listens for RF command; and converts the RF command into equivalent DS message to invoke action supported by the Gateway 150 control manager 1800.

The Stream Replication Service 1890 retrieves remote media streams and then replicates them to the recording service 1815, rStreamer 1825, media player, and/or EPG guide service 1835. An IP cam module 1845 is also available to retrieve IP camera streams. The service demuxes and muxes MPEGTS containers; demuxes DVB Electronic Program Guide from MPEGTS stream; receives multicast, and RTSP; and replicates MPEGTS packet via RTP.

Figure 19:
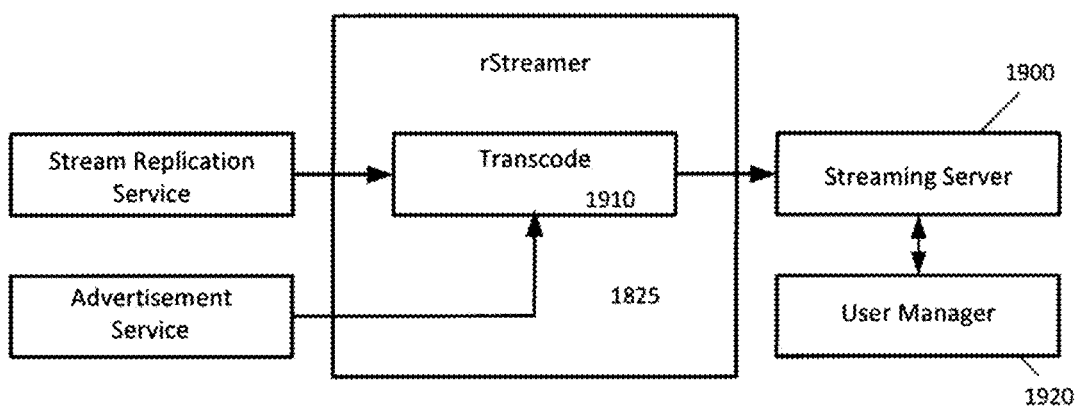
FIG. 19 shows a block diagram of an embodiment of an rStreamer service.

The rStreamer service 1825 mainly runs in the background as a streaming server 1900 to output media content into the required format. As shown in FIG. 19, the rStreamer includes two entities: the trans-coding/muxing module 1910, and a streaming server 1900. The trans-coding component 1910 is able to trans-code a video stream into H.264 baseline profile and mux logos and advertisements; trans-code an audio stream into AAC LC; mux video streams and audio into a MPEGTS container; and deliver to streaming server 1900 using RTP.

The streaming server component 1900 supports the streaming protocol, including Flash RTMP (to support all the desktop/laptop computers); Apple HTTP Live Streaming,(to support all iOS user devices); Microsoft Smooth Streaming (to support all Windows 7 Phones); and RTSP/RTP interleaved (to support all the RIM (Blackberry) devices) and, TV tuner sharing. The server 1900 services all the required streaming protocol over 1 single port. The streaming server 1900 receives the MPEGTS RTP stream. The video coder may be H.264 and the audio coder may be AAC. The streaming server interacts with the User Manager 1920 to provide access control.

The Recording service 1815 works with the replication service 1890 to record live TV programs to the gateway 150 hard disk. The Recording service 1815 also has a scheduler that tracks all recording sessions. Therefore the recording service receives MPEGTS RTP (the video may be encoded with H.264 and audio with AAC); tracks all recording schedules; and updates and reflects changes in the database.

Figure 20:
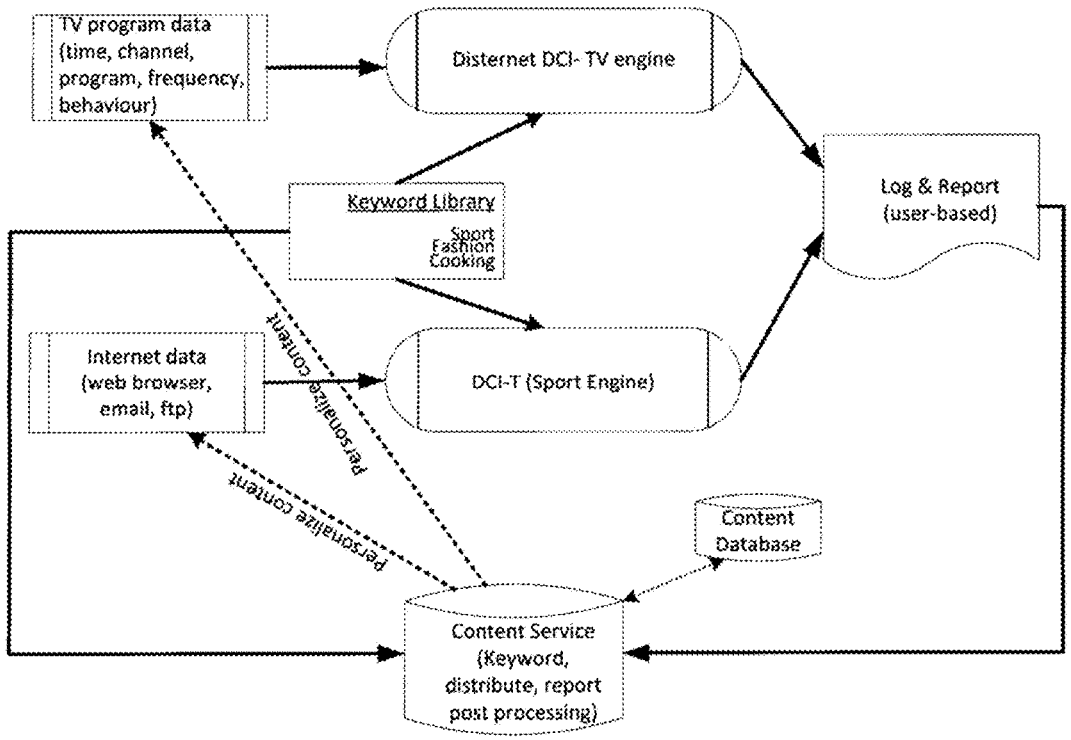
FIG. 20 is a flow chart showing the content inspection process.

Gateway 150 Content inspection function provides the "be aware" ability to Gateway 150, and allows Gateway 150 be a "smart box" and understand what is going on inside. It detects information and uses it to further characterization data to create value-add service for the service provider. The structure flow chart of content inspection is shown in FIG. 20.

Two types of data are generally handled by gateway 150, video and internet. A different interface is used for each type to implement basic capture and store functions. The result analyzing and audit function can be implemented in offline mode on either client side or server side. The content inspection provides the data for the multiplex to achieve accurate advertisement push.

The EPG service 1835 receives a DVB electronic guide from the Stream Replication Service 1890 via RTP. Then it updates the local cached EPG list, and notifies if there is a change in the guide. The EPG service 1835 thus receives MPEGTS RTP stream with DVB electronic program guide; processes DVB electronic program guide; and updates the locally cached EPG list.

The Media Share Service 1855 is responsible for searching and accessing multimedia contents shared in a home network. The Media Share Service thus supports DLNA; supports CIFS; and mounts all supported network file sharing protocols.

The User Manager service 1865 provides product feature control, account management, and parental control as well as gateway 150 user management. The product feature control ensures certain functionalities of gateway 150 are disabled or enabled based on the accounting information of the customer. Account management lets the customer review the services currently subscribed to, and order or cancel services.

The Advertisement Service 1875 provides logos and advertisements by communicating with an external advertisement server. The actual delivery protocol and specification of the format of the advertisement contents are defined in advance.

The DS Monitor 1885 enables post instrumentation and is based on three modules—monitoring, reporting and updating.

The Domain Service 1895 helps exposing gateway 150 to the public internet from a home network.

A Wi-Fi AP Service 1896 controls the built-in Gateway 150 wireless access point. Once enabled, this service will be responsible for providing DHCP service; detecting new user devices; and managing firewall and application port-forwarding.

A Channel-based Chat service manages and services channel based chats. A channel-based chat is a service that allows the end user to automatically join a different social chat room based on the current channel selected.

The Proximity P4P service 1897, like content inspection, will mainly be used by the service provider to provide network-optimized content delivery.

An Application Loader Service allows third parties to develop applications that make use of Gateway 150 services. This service thus can load and unload a signed Java application package JAR, and enforce rules; and the service contains a Java API that exposes Gateway 150 services.

Gateway 150 can use previously determined location information to optimize content delivery. If more than more node trying to access the same content, the content deliver path could be optimized for the best usage of network. The services involved include the content management and location management services, and each gateway 150 acts as a network node of this matrix with a content management server on the service provider side.

The workflow includes the gateway 150 sending out the content request with the location information to the content server in the service provider data center. The content management services will check the current mapping table, select the most "near" (network topology) node (which already contain the content) and sends a redirect for the request to the select node. The proximity based P4P service could become a cloud computing platform.

The hardware abstraction layer (HAL) allows for hardware independent software. This layer requires the whole software to be aware of the porting capacity. Software modules that interact with HAL include: USB Keyboard Driver; Audio Mixer; Video demux; Video decoder/encoder; Audio decoder/encoder; and TV tuner interface.

The Database Layer includes two database interfaces, one inside the Gateway 150 locally and the other in the service provider data center. The local database stores user account information, content information, inspection data and audit information as well as providing data access interface through an API. The service provider manages the Gateway 150 and collects data related to Gateway 150, such as default data, characterization data, user backup data and so on. The Gateway 150 management client also communicates with third party Management systems to retrieve customer account information.

Product Description

Gateway 150 does not require installation of a client application on any of the user devices. All traffic is handled by Gateway 150 through an AI (Artificial Intelligent) engine that can distinguish and manage each user's traffic, under varying connectivity situations (device, network type, location, etc.). The approach distributes the CPU and memory requirements for millions of users out to the subscribers' premises, similar to a subnet, enabling faster and more accurate data processing. This unique capability enables Gateway 150 to provide the following features.

Therefore, there is no need for large advertisement insertion servers; Gateway 150 directly connects to the advertisement content and brings the content to the content being watched. It can simply be an unmanaged content overlaid from any source the user was actually browsing when s/he was on the Internet. An advertisement for one user within a premise could be completely different from another user within the same premise, each based on the Internet content they are viewing.

Another feature is that all types of usage traffic can be reported to the operator for billing purposes. Operators will be able to bill users and content vendors. This includes generating advertisement revenue from managed or unmanaged sources or generally speaking from any content vendor that the user is subscribed to.

Sharing content among Gateway 150(s) can be either a known feature for the users or a transparent feature focusing on delivering benefits to the operators.

User's content sharing: Gateway 150 can provide user owned storage and allow users to share their content between users, either within or outside the premise and between friends. It must be noted that either are possible and configurable based on a service provider's policy model.

Operator's content sharing: Gateway 150 enables a service provider to reduce the traffic over their core-network and enables them to use gateway 150 as distributed CPU and storage. An example of such functionality is when two users are watching the same VoD. One of the users could get the VoD from the other gateway 150 instead of accessing the service provider server in a regional office or deep core-network. Another example of such functionality could turn gateway 150 into distributed nodes with a massive number of TV tuners for recording different programs that run simultaneously. Two users, each with a single TV tuner gateway 150 that have access to same channels, can share the program that each has recorded (be peer-to-peer content streaming). Note that the policy of access, digital right management and billing for all features always taken into consideration.

Control Manager

The control manager is responsible for registration of user devices 180 with gateway 150, including information about the capabilities and limitations of such user device 180 and the users with whom the user device 180 is associated.

The control manager maintains usage logs for each user device. These logs can be used to improve Quality of Service (QoS) by determining when errors or poor performance occurs and taking steps to improve the quality (for example by increasing the buffer for streaming video).

The control manager acts as a message broker between user devices when one is used to interact with or access content on the other.

The control manager also manages the TV tuners included as part of the box. Such tuners, and associated EPG information, are set to the appropriate channel and output to the appropriate user device by sending a request to the streaming server.

All traffic is being handled by Gateway 150 through an AI (Artificial Intelligent) engine that can distinguish and manage each user's traffic, under varying connectivity situations (device, network type, location, etc.). The approach distributes the CPU and memory requirements for millions of users out to the subscribers' premises, similar to a subnet, enabling faster and more accurate data processing.

Streaming Server

The streaming server handles several duties. It opens the port to the TV tuner, and handles the Electronic Program Guide (EPG), and modifying the format to the type of user device requesting the signal.

The streaming server also sets and monitors the quality of signal based on the size of the display. The streaming serve controls the size of the buffer needed based on the limitations of the device, its processor, the size of the display and the signal. Past user experiences with the device may be taken into account.

The streaming server thus can adapt to learned limitations of a user device to improve experience and can handle resolution changes and needs.

When a user device is receiving Internet content, the streaming server can send a link to the user device to the content and play no other role. Alternatively, if the user device is local to the streaming server, the gateway can receive the content and adapt it for the user device.

The streaming server uses a transcoder to convert content from one format to another. The transcoder provides both a coding and decoding process. It receives input, decodes it, and codes it again as needed by the user device.

Distant User Devices

One use of gateway 150 is to take advantage of the connection between the user device and gateway 150, which occurs even if the user device is distant from the gateway (e.g. outside of Wi-Fi range). This allows a user device to receive advertisements based on the user's past experiences, like browsing history on other user devices and personal interests, not available when logging in directly to a distant network.

In this use of gateway 150, a user at a remote location uses a user device, such as a smart phone, to access the Internet from a location far from the gateway 150. By accessing gateway 150, advertisements presented to the user on the user device may be directly target based on the UCC-E and CP-E.

Bit Rate

The gateway 150 streaming server approach uses a single transcoder to provide multi-bitrate adaptive streaming for a single user, as opposed to a separate transcoder for each bitrate that is provided to the user.

Our streaming server advertises multiple bitrates to a client device, and then begins transcoding at the first requested bitrate. As the client device requests different bitrates (based on network conditions and the client's hardware capability), the server reads these requests and seamlessly adapts its transcoder parameters to accommodate the client's request. A single transcoder has its parameters tuned for a single client's requests, so a single transcoder can only service a single client.

This allows gateway 150 to scale well with the number of bitrates provided (as only one transcoder is ever required for a single user). This approach does not scale well with the number of users requesting streams (each user requires one transcoder), so this approach is likely not preferable if the number of users with access to the server is larger than the number of transcoders available. However, as the number of expected users of gateway 150 is relatively low (family sized), the expected range of bitrates provided will have a larger impact on gateway 150 then the number of users.

Multi-Tasking on User Devices

Gateway 150 allows users to use their TV display for a many functions simultaneously. For example, a user can view a movie, make an Internet call (Skype) with a friend, and share a video or audio file all at the same time on the same device.

Gateway 150 accomplishes this by splitting the TV display into different zones, and displaying different content, transcoded appropriately, in each zone. Each zone can individually access a menu and receive commands, and can display content fetched, including content from Internet, and can enable users to access other viewers' feedback and ratings regarding any targeted or in progress content in an assigned zone.

User Information & Communication with Service Provider Server

Gateway 150 frequently communicates with service provider servers for a number of reasons. For examples when a new gateway 150 is purchased and configured, the gateway 150 registers with the service provider server and becomes associated with a customer, as well as the registered users and user devices. When changes are made, for examples, new users or user devices registered, the service provider server is updated accordingly.

Gateway 150 functions as a dynamic DNS server by handling changes to the IP addresses associated with gateway 150, as assigned by the ISP (which may be the service provider).

Gateway 150 can function as a feedback device for the service provider. Questions and surveys can be directed to registered users, and provided by gateway 150 to the service provider with appropriate demographic information about the responding user.

This feedback could be used to instantly obtain user opinions on content, such as TV pilot episodes, scheduling, or services. For example, a TV pilot could be aired, and followed immediately with a few questions asking user who viewed the pilot whether they would follow the series, perhaps even with questions related to time slot, plots, and characters.

The feedback could also be used to determine TV ratings. Gateway 150 already knows at least one registered user is watching a particular program at a particular time. A question as to identifying any other users watching is all that is required to allow gateway 150 to provide information for inclusion in TV ratings, such as those provided by Nielsen. If a sufficient number of gateway 150s are in use, it can be a simple function to determine very accurate viewership of a particular program, along with information about PVRing of the program.

Other feedback could be used to inquire about the success of advertisements (e.g. is a trailer more likely to draw someone to a movie; or is a political advertisement likely to sway a voter).

Gateway 150 can also be used for policy management, particularly as the files are stored on gateway 150, and the content can be policed by the service provider, for example by deleting PPV files, once watched.

The parental control system is quite flexible. If the video or audio content, either from Internet or the TV, is encoded to include rating information by scene, then gateway 150 can modify the content accordingly. In this embodiment, for example, if the parental control indicates that certain language is not to be output, then gateway 150 can simply leave out such audio according to the audio stream information. Similar systems could be used for sexual or violent content, as gateway 150 could simply excise portions of the video stream.

Alternatively if a database about the times within a video or audio stream when potentially objectionable content takes place is available at service provider servers, the content could be excised based on the time played of the video stream.

Service provider can also monitor gateway 150 by logging into gateway 150 remotely, accessing logs and hard drives, etc. The service provider can even take control of gateway 150 if necessary.

Gateway 150 provides users with means for social networking. Users will have access to popular social networking services, such as Facebook and LinkedIn, but will also have access to a community of gateway 150 users. Users of gateway 150 can mark content stored on gateway 150 as public or private. Public content may be made available to users of other gateway 150s, possibly limited to "friends" of the user with the content. Private content will not be so accessible. Public content can be streamed to other gateway 150s, even when the user is performing a different task, for example watching TV. Both the sending user and receiving user may be watching the same TV program simultaneously while engaging in VoIP discussion about same and exchanging a file.

Gateway 150 can also be used to target advertising specifically to user activities. For example, when a user is watching TV content, for example a music video, if an Internet viewing screen is enabled; they could be presented with an advertisement for purchase of that same, or very similar, music content. Likewise, when a user is watching a TV program, they could be presented with an advertisement for the DVD of the previous season of that same program. When selecting appropriate advertising for users, the service provider will also have the information from gateway 150 about the user's interests, demographics, and habits.

For the sake of convenience, the embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A method performed in a gateway, the method comprising:
   splitting a display of a user device into two or more zones, wherein each zone of the two or more zones is assigned to a respective user of two or more users, and wherein the user device is associated with the two or more users;
   providing a video stream to the user device, wherein the video stream is displayed on a zone, of the two or more zones, corresponding to a user of the two or more users;
   providing a questionnaire to the user, wherein the questionnaire is answerable on the user device, and wherein the questionnaire includes questions and surveys regarding the video stream;
   retrieving answers to the questionnaire from the user;
   identifying users other than the two or more users watching the video stream based on the retrieved answers; and
   providing information on the identified users to a service provider server for determining a rating of the video stream, wherein the gateway is registered with the service provider server prior to providing the information on the identified users to the service provider server.

2. The method of claim 1, further comprising:
   providing, to the user, feedback regarding in-progress content in respective two or more zones, of remaining users of the two or more users.

3. The method of claim 1, further comprising:
   searching the web, and content producers and distributers for the video stream; and
   indexing the video stream based on the search.

4. The method of claim 1, further comprising transcoding the video stream to be provided to the user device based on characteristics of the user.

5. The method of claim 1, further comprising recording the video stream, wherein the recorded video stream is stored in a memory of the gateway.

6. The method of claim 1, further comprising providing demographic information associated with the user to the service provider server.

7. The method of claim 1, wherein the questionnaire comprises questions related to time slot, plots, and characters associated with the video stream.

8. The method of claim 1, wherein the video stream comprises a plurality of scenes, and wherein the method further comprises modifying the video stream based on rating information associated with each scene of the plurality of scenes.

9. The method of claim 1, further comprising modifying the video stream based on time played of the video stream.

10. A gateway operable to:
    split a display of a user device into two or more zones, wherein each zone of the two or more zones is assigned to a respective user of two or more users, and wherein the user device is associated with the two or more users;
    provide a video stream to the user device, wherein the video stream is displayed on a zone, of the two or more zones, corresponding to a user of the two or more users;
    provide a questionnaire to the user, wherein the questionnaire is answerable on the user device, and wherein the questionnaire includes questions and surveys regarding the video stream;
    retrieve answers to the questionnaire from the user;
    identify users other than the two or more users watching the video stream based on the retrieved answers; and
    provide information on the identified users to a service provider server for determining a rating of the video stream, wherein the gateway is registered with the service provider server prior to the provision of information on the identified users to the service provider server.

11. The gateway of claim 10, further operable to:
    provide, to the user, feedback regarding in-progress content in respective two or more zones, of remaining users of the two or more users.

12. The gateway of claim 10, further operable to:
    search the web, and content producers and distributers for the video stream; and
    index the video stream based on the search.

13. The gateway of claim 10, further operable to transcode the video stream to be provided to the user device based on characteristics of the user.

14. The gateway of claim 10, further operable to record the video stream, wherein the recorded video stream is stored in a memory of the gateway.

15. The gateway of claim 10, further operable to provide demographic information associated with the user to the service provider server.

16. The gateway of claim 10, wherein the questionnaire comprises questions related to time slot, plots, and characters associated with the video stream.

17. The gateway of claim 10, wherein the video stream comprises a plurality of scenes, and wherein the gateway is further operable to modify the video stream based on rating information associated with each scene of the plurality of scenes.

18. The gateway of claim 10, further operable to modify the video stream based on time played of the video stream.

\* \* \* \* \*